United States Patent
Inagawa

(10) Patent No.: US 8,320,482 B2
(45) Date of Patent: Nov. 27, 2012

(54) COMMUNICATION APPARATUS AND OFFSET CANCELING METHOD

(75) Inventor: Osamu Inagawa, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 523 days.

(21) Appl. No.: 12/605,620

(22) Filed: Oct. 26, 2009

(65) Prior Publication Data
US 2010/0118999 A1 May 13, 2010

(30) Foreign Application Priority Data
Nov. 7, 2008 (JP) ................... 2008-286303

(51) Int. Cl.
*H04K 1/10* (2006.01)
(52) U.S. Cl. .................. 375/260; 375/296; 375/299
(58) Field of Classification Search .......... 375/260, 375/261, 318, 319, 343
See application file for complete search history.

(56) References Cited

U.S. PATENT DOCUMENTS

| | | | | |
|---|---|---|---|---|
| 6,801,581 B1 * | 10/2004 | Francos et al. | ........... | 375/296 |
| 7,711,065 B2 * | 5/2010 | Wong et al. | ........... | 375/296 |
| 7,911,254 B2 * | 3/2011 | Ohba et al. | ........... | 327/307 |
| 2005/0025255 A1 * | 2/2005 | Francos et al. | ........... | 375/296 |
| 2005/0276358 A1 * | 12/2005 | Pipilos | ........... | 375/345 |
| 2008/0253431 A1 | 10/2008 | Ohba | | |
| 2009/0285263 A1 * | 11/2009 | Seller | ........... | 375/130 |

FOREIGN PATENT DOCUMENTS

| | | |
|---|---|---|
| JP | 2006-080689 | 3/2006 |
| JP | 2008-258741 | 10/2008 |

OTHER PUBLICATIONS

ECMA, Standard ECMA-368, 2nd Edition/ Dec. 2007, High Rate Ultra Wideband PHY and MAC Standard.

* cited by examiner

*Primary Examiner* — David Ometz
*Assistant Examiner* — Qutbuddin Ghulamali
(74) *Attorney, Agent, or Firm* — Young & Thompson

(57) ABSTRACT

There is already disclosed a technique for an MB-OFDM communication system whereby an orthogonal demodulation section removes a DC offset generated in a received signal in a region where the received signal is an analog signal, but the removal of the DC offset in the analog region cannot prevent the DC offset from remaining, and therefore the DC offset needs to be effectively removed in a digital region. An offset canceling section 26 calculates an average value of amplitude of a signal which should have an average of amplitude within a predetermined time range of 0, subtracts the average value from the signal and thereby removes an offset included in the signal.

4 Claims, 16 Drawing Sheets

COMMUNICATION APPARATUS AND OFFSET CANCELING METHOD

BACKGROUND OF THE INVENTION

1. Field of the Invention

The present invention relates to a communication apparatus that receives a radio signal, and more particularly, to a communication apparatus that uses an MB-OFDM (Multi-band-Orthogonal Frequency Division Multiplexing) communication system.

2. Description of the Related Art

In the field of radio communication, a multicarrier transmission scheme is in the limelight as a technique for suppressing influences of frequency selective fading. In the multicarrier transmission scheme, transmission data is distributed into a plurality of carriers of different frequencies and transmitted. This narrows the bandwidth of each carrier and makes the transmission data less susceptible to frequency selective fading.

For example, in an OFDM (orthogonal frequency division multiplex) scheme, which is one of multicarrier transmission schemes, frequencies of respective carriers are set so as to be orthogonal to each other in a symbol space. At the time of transmission, a plurality of pieces of data obtained by serial/parallel-converting a serial signal at symbol periods corresponding to a rate lower than the transmission rate are allocated to their respective carriers, subjected to amplitude and phase modulation carrier by carrier, and a plurality of carriers are subjected to inverse FFT (Fast Fourier Transform). The transmission data is transformed through these processes into a time domain signal with orthogonality of the respective carriers kept on the frequency domain and transmitted. At the time of reception, the revere operation, that is, FFT transform is performed on the signal to transform the time domain signal into a frequency domain signal, the signal is subjected to demodulation corresponding to a modulation scheme of each carrier, parallel/serial-converted and the original serial signal is thereby obtained.

In an MB-OFDM communication system known as UWB (Ultra Wide Band) adopting this OFDM scheme, a frequency band of 3.1 to 10.6 GHz is divided into 14 bands, each band having a 528 MHz bandwidth, and from these bands, five groups of bands are formed, each group being made up of 3 or 2 bands. An OFDM signal is transmitted by switching between different frequency bands in each band group according to time/frequency code, that is, while realizing frequency hopping ("High Rate Ultra Wideband PHY and MAC Standard", Ecma international standard ECMA-368 2nd Edition, December 2007, PP. 14-16).

Since the MB-OFDM communication system switches between carrier frequencies on the transmitting side by making the carrier frequencies realize hopping, the frequency of a signal received by an antenna on the receiving side also changes based on a frequency hopping pattern. When the receiving side receives a signal in such a situation, the receiving side multiplies the signal by a local signal having substantially the same frequency as a central frequency of the frequency band to which the received signal belongs via a mixer (mixing). Such mixing causes the frequency band of the received signal to be converted from the frequency band having the carrier frequency as the central frequency to a frequency band of baseband. This conversion scheme is called a "direct conversion scheme". Here, Japanese Patent Application No. 2007-096412, which was not yet open to the public when the application for the present invention was filed, discloses that a phenomenon called "self-mixing" occurs when this direct conversion scheme is performed. The "self-mixing" refers to a phenomenon that a component of a local signal outputted from a local oscillator is mixed into a signal route of a received signal from an antenna, superimposed on the received signal from the antenna and inputted via the mixer. Once this self-mixing has occurred, a DC offset, which is an unnecessary signal component, is included in the signal outputted from the mixer. Japanese Patent Application No. 2007-096412 discloses that the MB-OFDM communication system in which the frequency of a signal received changes also needs to change the frequency of a local signal to be inputted to the mixer, and therefore the amount of the local signal component mixed into the signal route of the received signal also changes, which causes the amount of DC offset included in the signal outputted from the mixer to change as well.

FIG. 18 shows a configuration of a demodulator described in Japanese Patent Application No. 2007-096412. Japanese Patent Application No. 2007-096412 discloses a technique for removing a DC offset of a signal outputted from a mixer while also coping with a variation in the amount of DC offset caused by a variation in the frequency of the local signal outputted from the local oscillator in a region where the signal received via the antenna is an analog signal. To be more specific, DC offsets generated in differential signals outputted from the mixer are stored in a capacitor. The above described document discloses the technique of turning ON a switch after the capacitor in synchronization with the switching of a hopping frequency at a guard interval, short circuiting the differential signal line and thereby removing the DC offset seen as the differential signal.

Furthermore, for example, Japanese Patent Laid-Open No. 2006-80689 discloses a technique of removing such unnecessary signal components. A communication apparatus having a successive reception mode and intermittent reception mode repeatedly starts and stops reception. An excessive response occurs every time a reception starts. If a signal is received when an excessive response occurs and baseband processing is performed, the reception error rate deteriorates. The technique described in Japanese Patent Application No. 2007-096412 acquires data indicating this excessive response beforehand and stores the data in a storage section and corrects, when a reception starts, the waveform of the received signal using the data indicating the excessive response stored in the storage section.

The present inventor discovered that above described Japanese Patent Application No. 2007-096412 involves the following problems. Although Japanese Patent Application No. 2007-096412 claims that it is possible to remove a DC offset while coping with a variation in the amount of the DC offset caused by a frequency variation of the local signal, there are cases where the technique described in Japanese Patent Application No. 2007-096412 cannot completely remove the DC offset generated in the received signal and the DC offset remains (the reason will be described later). The signal including the remaining DC offset is amplified by an amplifier, then converted to a digital signal by an AD converter, subjected to processing such as FFT (Fast Fourier Transform) and then subjected to various types of digital processing such as Viterbi decoding that carries out error correction.

Here, the MB-OFDM communication system performs processing called "overlap-and-add" (hereinafter, referred to as "overlap and add processing" in the present Specification) on the received signal converted to a digital signal. "Overlap-and-add" adds a component near the rearmost portion of a signal included within a certain predetermined time window to a component near the start of the signal included in such a time window. In radio communication, there are not only routes through which a signal directly arrives at a reception antenna from a transmission antenna but also routes through which a signal is repeatedly reflected at some midpoints and arrives at the reception antenna (so-called multipath). In this case, signals including the same information arrive at the antenna on the receiving side at different timings. The signal arriving at the reception antenna after repeating reflection arrives with a delay compared to the signal directly arriving at the reception antenna from the transmission antenna. On the other hand, since the delayed signals also include information to be received, it may be more efficient from the standpoint of receiving power for the receiving side to also regard the delayed signals as the reception targets. However, since the degree of time window with which FFT is performed on the received signal on the receiving side is predetermined, the receiving side cannot directly apply FFT to signal components so delayed as to go beyond the time window within which FFT is applied. This is because extending the predetermined time window for applying FFT according to a delay signal results in a problem that the frequency of the signal obtained through FFT is shifted from the frequency that should originally be acquired, that is, the frequency of the signal used on the transmitting side. The circuit on the receiving side is designed to be able to perform processing on signals of frequencies that should originally be acquired, and cannot handle signals of changed frequencies.

However, considering receiving power of a signal, the delay component of the received signal is also preferably handled as an object to be received. Therefore, MB-OFDM performs the above described overlap-and-add, that is, overlap and add processing. By adding a signal component so delayed as to go beyond a time window within which FFT can be applied to a signal component included near the start of the time window, it is possible to efficiently gain receiving power including the delay component of the received signal.

However, as described above, the technique according to Japanese Patent Application No. 2007-096412 may not be able to completely remove DC offsets depending on the situation. The reason is as follows. As shown in FIG. 18, the demodulator according to Japanese Patent Application No. 2007-096412 turns ON the switch after the capacitor during a guard interval period for switching between frequencies of local signals and causes the differential signal lines to be short circuited to thereby reduce the potential difference between the differential signal lines to 0. By so doing, the DC offsets when seen as the differential signals are removed. On the other hand, according to Japanese Patent Application No. 2007-096412, a separate switch is also provided before the frequency conversion section. The reason is as follows: When reducing the potential difference between the differential signal lines by turning ON the switch after the capacitor during the guard interval period to 0, the switch before the frequency conversion section is also turned ON for such a guard interval period so as to prevent noise from the antenna and low-noise amplifier from entering sections from the frequency conversion section and subsequent sections for a period of charging/discharging the capacitor. When a noise component is inputted to the capacitor for the period of charging/discharging the capacitor, the amount of charge stored in the capacitor changes and the potential difference between the two differential signal lines can no longer be reduced to 0 during the guard interval period. This is intended to avoid such a problem. Therefore, the technique in Japanese Patent Application No. 2007-096412 turns ON the switch before the frequency conversion section first, then turns ON the switch after the capacitor, then reduces the potential difference between the differential signal lines to 0, turns OFF the switch after the capacitor and then turns OFF the switch before the frequency conversion section.

However, since signals handled by the switch after the capacitor shown in FIG. 18 are baseband signals, this is a switch using a large-size transistor, whereas the switch before the frequency conversion section is a switch applicable to a high-frequency signal. High-frequency switches need to use small-sized transistors. This is because using a large-sized transistor would cause the component of parasitic capacitance to increase and interfere with the operation of the demodulator applicable to wideband signals. Therefore, the switch before the frequency conversion section in FIG. 18 includes ON resistance of not negligible magnitude and even if such a switch is turned ON, the two differential signal lines are not completely short circuited. In such a case, even if such a switch is turned ON, it is not possible to completely prevent noise from entering parts from the frequency conversion section onward.

This is because when ON resistance of not negligible magnitude exists even when the switch is ON, not only a signal component flowing through the switch but also a signal component flowing through the frequency conversion section is produced. Therefore, as described above, the technique according to Japanese Patent Application No. 2007-096412 turns OFF the switch after the capacitor during the guard interval period and then turns OFF the switch before the frequency conversion section, but since the two differential signal lines are not completely short circuited, when noise from the antenna or low-noise amplifier enters the demodulator in FIG. 18 after the switch after the capacitor is turned from ON to OFF, such noise also enters sections from the frequency conversion section onward. In such a case, the potential difference between the two differential signal lines is not reduced to 0 and reception of symbols including the information to be received is started. As explained so far, depending on the situation, there are cases where the technique according to Japanese Patent Application No. 2007-096412 cannot reduce the potential difference between the differential signal lines to 0 or completely remove DC offsets.

This means that a DC offset remains in the received signal to be subjected to the above described overlap and add processing. For example, performing the overlap and add processing in this condition results in a problem that the DC offset in the portion of the signal to be added increases. Moreover, since this remaining DC offset is amplified by an amplifier before being converted to a digital signal, the amount of DC offset increased through the overlap and add processing cannot help but further increase. Of course, the DC offset corresponding to the signal not subjected to the overlap and add processing is also amplified by the amplifier. Failure to remove the remaining offset has an adverse influence on the posterior processing such as FFT and decoding of error correcting code. Thus, the MB-OFDM communication system needs to appropriately remove, in the digital region, the DC offset which has not been removed in the analog region.

SUMMARY

Thus, noticing a case where an average value of amplitude of signals received by an antenna within a predetermined time range should originally be 0 as observed, for example, in an MB-OFDM communication system, the present inventor came up with an idea of a communication apparatus that removes a DC offset included in a received signal. To be more specific, the communication apparatus according to the present invention is characterized by including an offset canceling section that receives a first signal whose average amplitude within a predetermined time range should be 0, calculates an average value of amplitude within a predetermined time range of the first signal, receives a second signal and subtracts the average value from at least some of the amplitude values included in the second signal. For a signal whose average value of amplitude within a predetermined time range should originally be 0, the value indicated by a time average of the actually received signal means a DC offset, and therefore the DC offset can be removed by subtracting such an average value from the received signal. This technique is applicable to a digital signal and solves the above described problems recognized by the present inventor.

The present invention can effectively remove a DC offset included in a received signal.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

Figure 1:
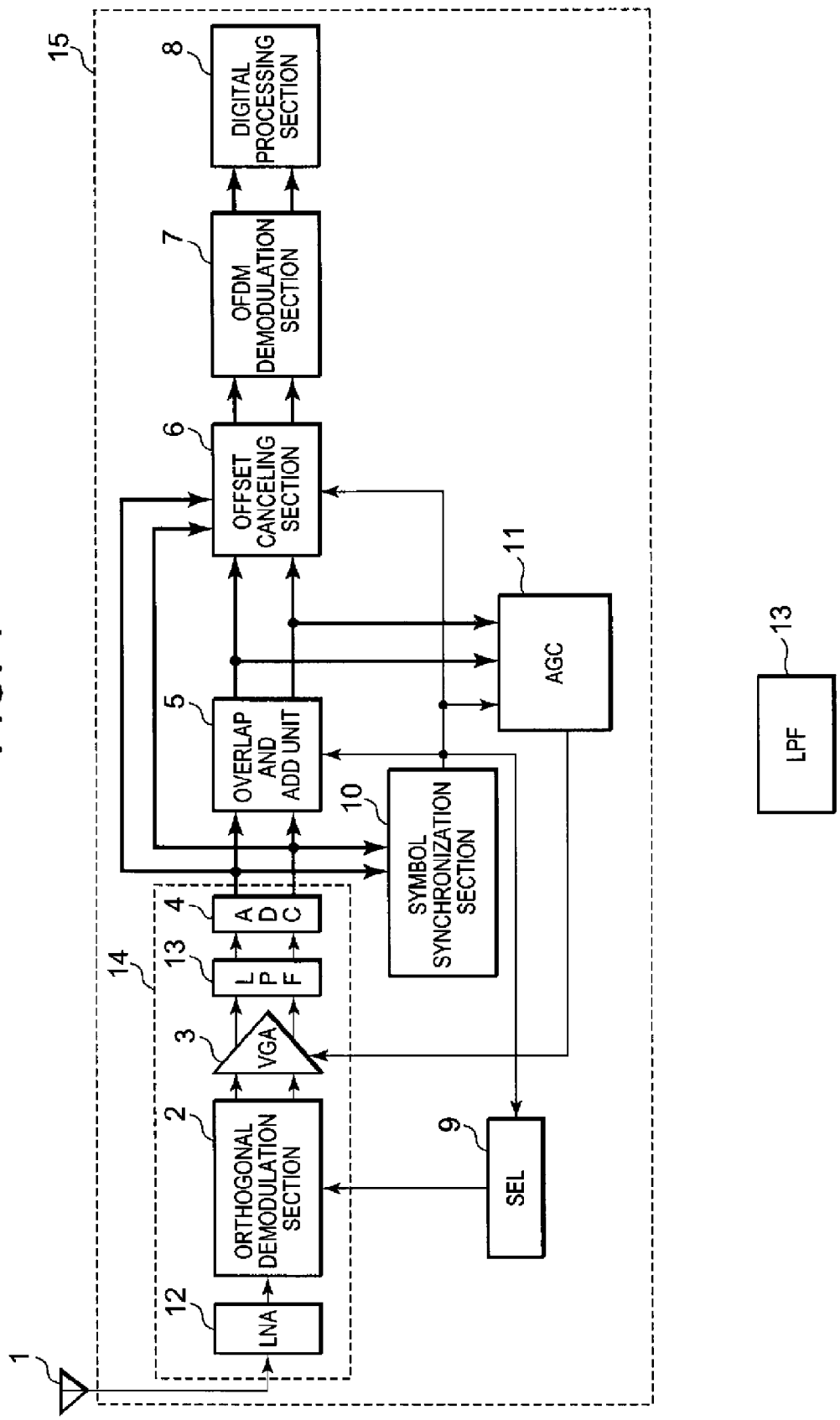
FIG. 1 is a block diagram showing a configuration example of a communication apparatus according to Embodiment 1 of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposes. Hereinafter, embodiments of the present invention will be explained with reference to the accompanying drawings. For clarity of explanation, suppose there are parts in the following descriptions and drawings omitted or simplified as appropriate. Among the drawings, components having the same configuration or function and equivalent parts will be assigned the same reference numerals and explanations thereof will be omitted. Furthermore, a case with an MB-OFDM communication scheme will be explained in the following embodiments as an example.

Embodiment 1

FIG. 1 is a block diagram showing a configuration example of a communication apparatus according to Embodiment 1 of the present invention. FIG. 1 shows components related to processes up to a process of converting an analog signal received via a radio channel to a digital signal. The communication apparatus in FIG. 1 is provided with an antenna 1, an orthogonal demodulation section (QDEM) 2, a VGA (Variable-Gain Amplifier) 3, an ADC (Analog to Digital Converter) 4, an overlap and add unit 5, an offset canceling section 6, an OFDM demodulation section 7, a digital processing section 8, an SEL 9, a symbol synchronization section 10, an AGC (Automatic Gain Control) 11, an LNA (Low Noise Amplifier) 12 and an LPF (Low Pass Filter).

Figure 2:
FIG. 2 a illustrates structure example of data received by the communication apparatus in FIG. 1.

First of all, the structure of data received by the communication apparatus in FIG. 1 of the present embodiment will be explained. FIG. 2 illustrates such a data structure. Receive data is divided into three regions of a preamble, header and payload in that order from the start. The preamble, whose signal pattern is known to the receiving apparatus side, is used for processing to establish synchronization with the received signal or the like. The symbol synchronization section 10 included in the communication apparatus in FIG. 1 performs the processing to establish synchronization with the received signal. The header is a portion including information on the payload. The payload includes data to be actually received.

Figure 3:
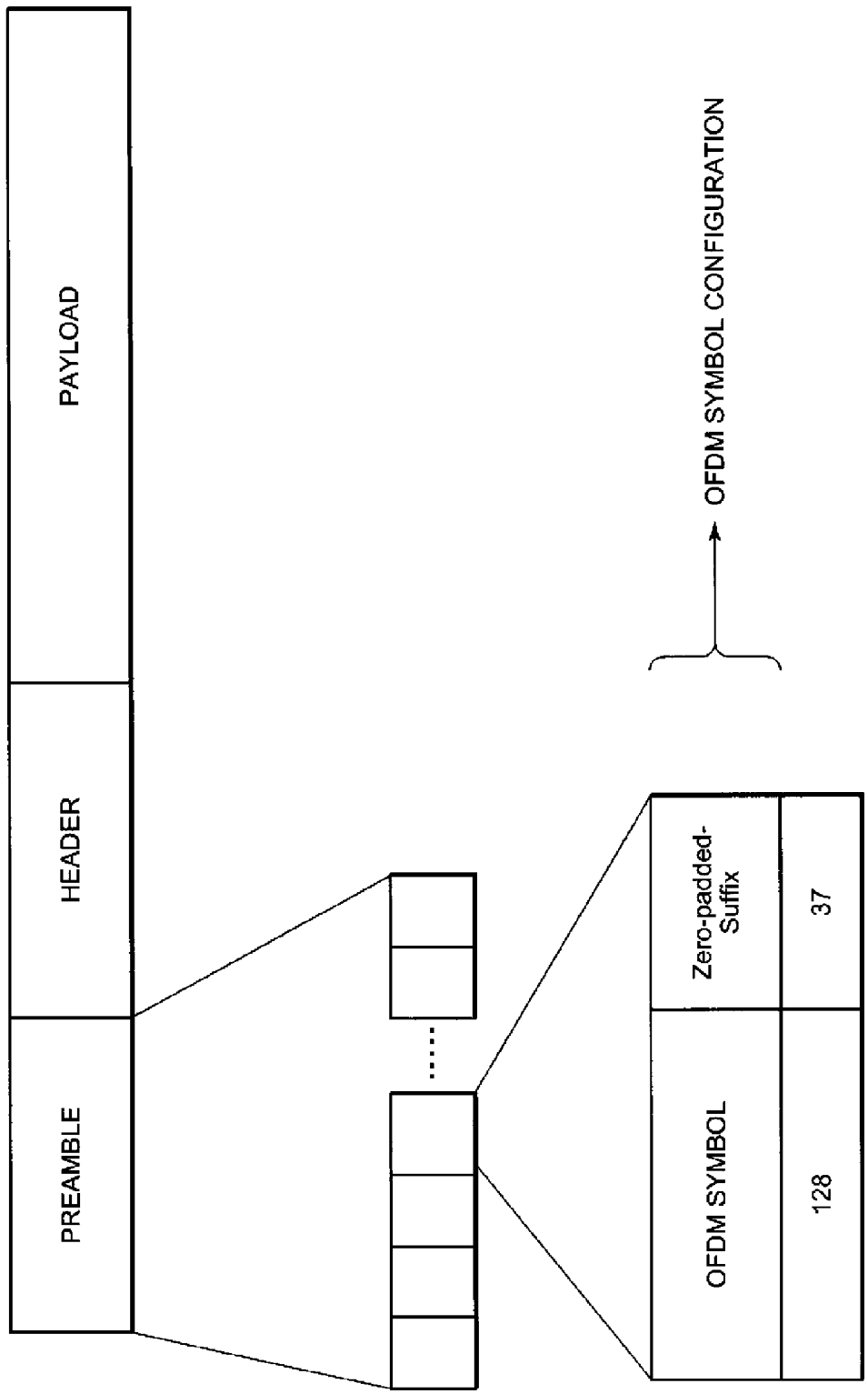
FIG. 3 illustrates the kinds of unit of information, of which a preamble, header and payload of the present invention are made up respectively.

FIG. 3 illustrates the kinds of unit of information, of which the preamble, header and payload are made up respectively. The preamble, header and payload are each formed of a plurality of serially connected OFDM symbol configurations, each of which is the unit of information shown in FIG. 3.

There are a variety of examples of the number of pieces of sampling data included in such an OFDM symbol configuration depending on the standard. For example, of the OFDM symbol configuration, the portion of the OFDM symbol includes 128 pieces of sampled data. On the other hand, the portion of Zero-padded Suffix (also referred to as a "ZPS section") includes 37 pieces of sampled data and is used as a guard time for preventing interference among symbols and a hopping switching time.

Next, an overview of operations of the communication apparatus will be explained. A signal transmitted from the communication apparatus on the transmitting side is received via the antenna 1 and the received signal is inputted to the orthogonal demodulation section 2 via the LNA 12.

The orthogonal demodulation section 2 uses a direct conversion scheme to divide the signal into an Ich signal corresponding to an in-phase component of the received signal and a Qch signal corresponding to a quadrature component of the received signal. The VGA 3 amplifies the Ich signal and Qch signal to a desired voltage and outputs those signals to the ADC 4 via the LPF 13. The ADC 4 converts the amplified Ich signal and Qch signal from an analog signal to digital signal. The overlap and add unit 5 corrects symbols for a delay spread produced through propagation of signals between transmission and reception.

The offset canceling section 6 removes unnecessary signal components mixed into the received signal in the processing of the orthogonal demodulation section 2 and VGA 3 from the Ich signal and Qch signal respectively. The OFDM demodulation section 7 OFDM-demodulates the Ich signal and Qch signal and the digital processing section 8 performs digital processing using the OFDM-demodulated signal. The digital processing section 8 includes, for example, a decoding section that decodes an error correcting code or the like.

Here, before starting to explain more specific operations of the respective sections of the communication apparatus, the symbol synchronization section 10 will be explained. As described above, the communication apparatus starts reception from the preamble in the data structure shown in FIG. 2 first. Here, the symbol synchronization section 10 establishes synchronization with the received signal using a pattern of the preamble received via the antenna. When the symbol synchronization section 10 is successful in establishing synchronization with the received signal using the preamble of the received signal, the symbol synchronization section 10 can know at what timing the frequency of the local signal outputted from the local oscillator of the orthogonal demodulation section 2 should be changed or what part of the received signal should be subjected to overlap and add processing or the like. The symbol synchronization section 10 may report timings at which processing to be performed is actually performed to the SEL 9, overlap and add unit 5, offset canceling section 6 and AGC 11 of the communication apparatus in FIG. 1. Hereinafter, suppose timings of the operations of the respective processing blocks included in the communication apparatus 1 in FIG. 1 are appropriately controlled by the symbol synchronization section 10.

In the present Specification, a plurality of components for demodulating the received signal into a baseband signal may be collectively referred to as an "analog front end 14." FIG. 1 shows an example where the signal processing section is realized by the LNA 12, orthogonal demodulation section 2, VGA 3, LPF 13 and ADC 4. Furthermore, FIG. 1 defines the range of the LSI (Large Scale Integration) 15. The range of the LSI 15 is not limited to the one in FIG. 1, but various cases, for example, a case where the LNA is provided outside the LSI may be thought of.

The antenna 1 receives an analog signal transmitted from the communication apparatus on the transmitting side. In the MB-OFMD communication system, the frequency band to which a carrier used for a signal to be transmitted from the transmitting side belongs changes. The pattern of a variation of such a frequency band is predetermined as a frequency hopping pattern.

Figure 4:
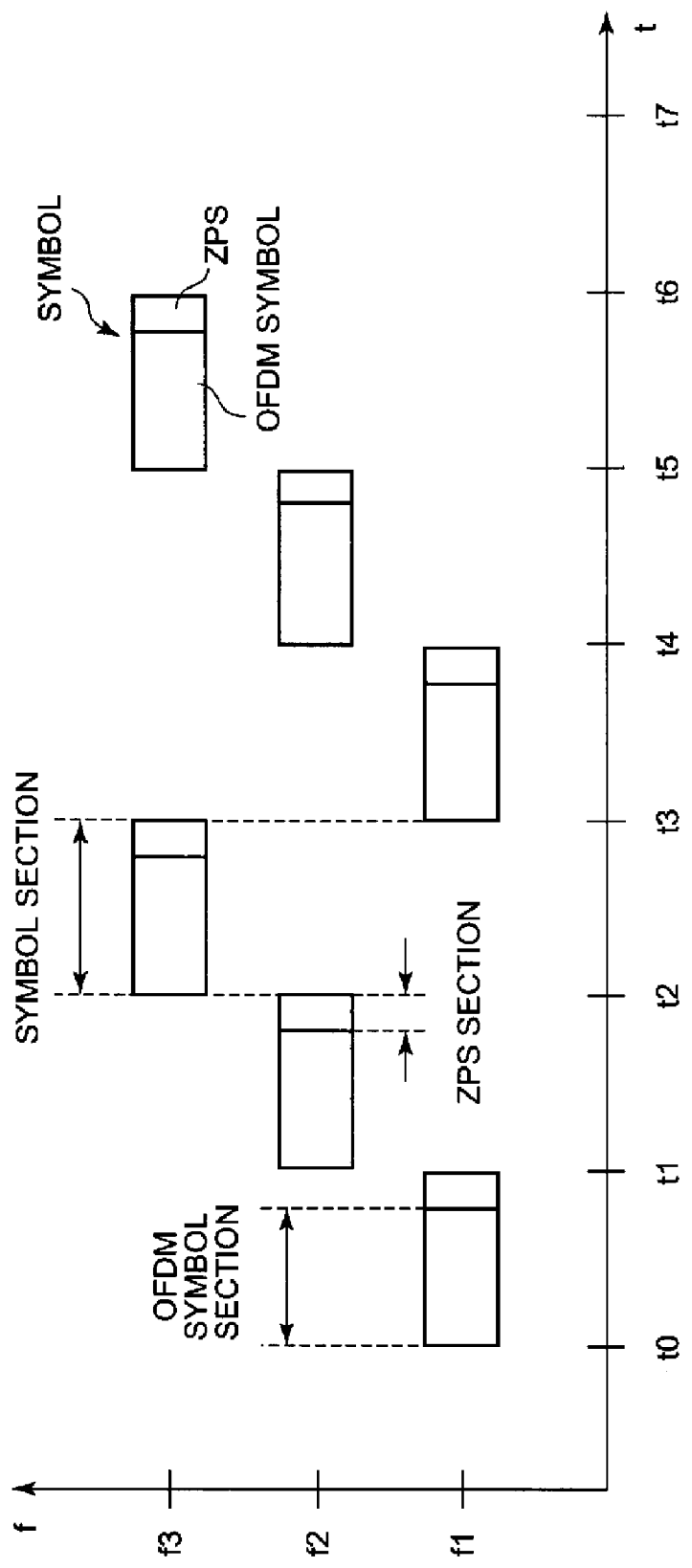
FIG. 4 shows an example of a signal received by the communication apparatus in an MB-OFDM communication system.

An example of a signal received by the communication apparatus in the MB-OFDM communication system will be explained using FIG. 4. In FIG. 4, the horizontal axis shows time (t) and the vertical axis shows frequency (f). In the MB-OFDM communication system, a high-frequency band of 3.1 to 10.6 GHz is divided into 14 bands, each band having a 528 MHz bandwidth, and from these bands, five groups of bands are formed, each group being made up of 3 or 2 bands. FIG. 4 shows an example where one band group is divided into three frequency bands having central frequencies of f1, f2 and f3. In this example, the central frequency of the frequency band to which a carrier used on the transmitting side belongs changes cyclically in order of f1→f2→f3. The MB-OFDM communication system uses a carrier having a frequency that belongs to a band whose central frequency is f1 for a first symbol in the OFDM symbol configuration shown in FIG. 4. Furthermore, for a second symbol which is a symbol in the OFDM symbol configuration shown in FIG. 4 and transmitted next to the first symbol, a carrier having a frequency that belongs to a band whose central frequency is f2 is used. Likewise, for a third symbol which is a symbol in the OFDM symbol configuration shown in FIG. 4 and transmitted next to the second symbol, a carrier having a frequency that belongs to a band whose central frequency is f3 is used.

Figure 5:
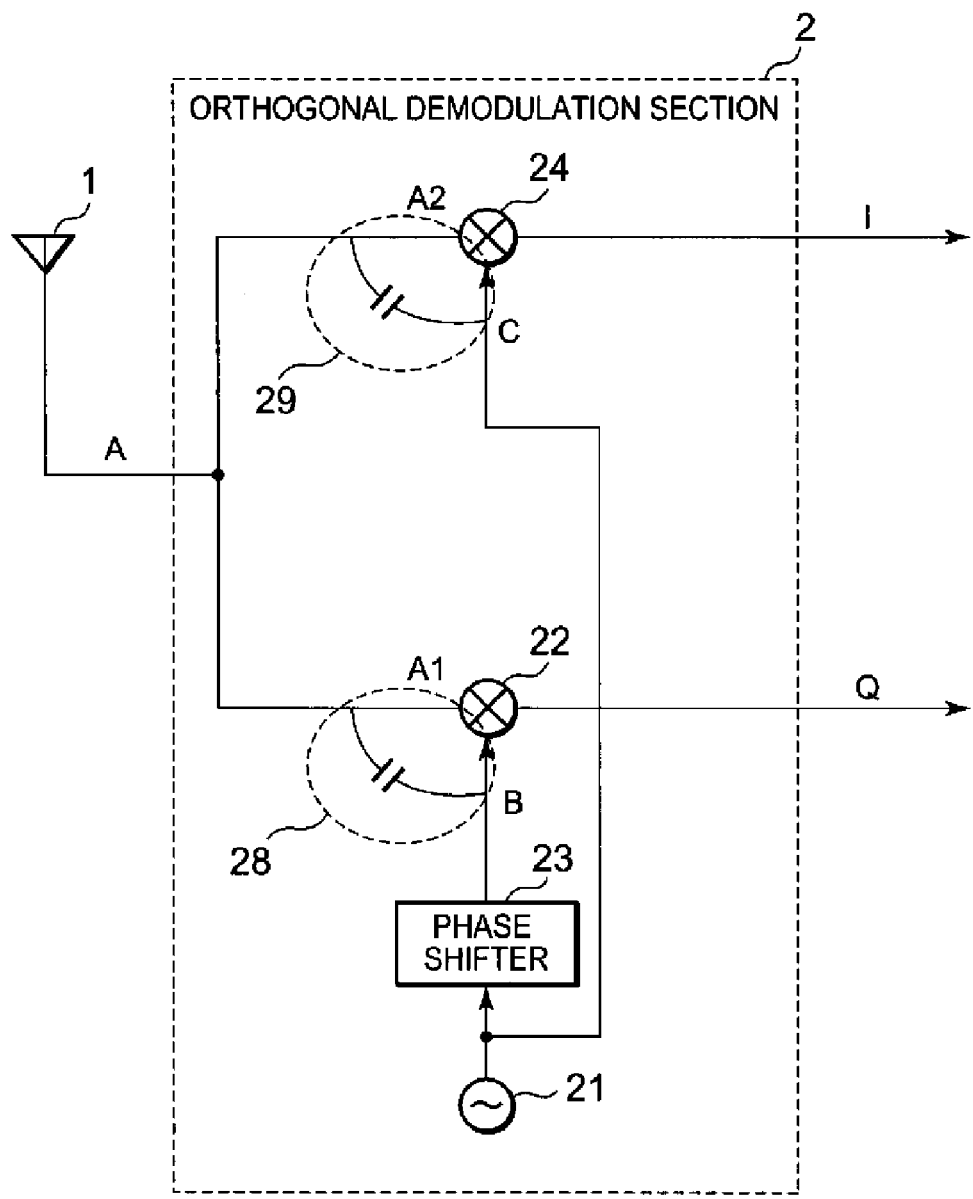
FIG. 5 illustrates a configuration example of the orthogonal demodulation section of Embodiment 1.

FIG. 5 illustrates the receiving apparatus according to the present embodiment. The orthogonal demodulation section 2 converts a signal received by the antenna 1 from a high-frequency signal to a baseband signal. The orthogonal demodulation section 2 receives a report of information on the central frequency of the carrier, or to be more specific, which of f1, f2 or f3 is the central frequency of the carrier from the SEL 9. FIG. 5 shows a configuration example of the orthogonal demodulation section 2 of the present embodiment. Particularly in a case where no offset is included, a signal received by the antenna 1 in the MB-OFDM communication system is such a signal that an average value of amplitude becomes 0 in a graph with the vertical axis showing a voltage and the horizontal axis showing a time scale. The orthogonal demodulation section 2 is provided with an oscillator 21, mixers 22 and 24 and a phase shifter 23. The oscillator 21 oscillates a local signal. The local signal is a signal having substantially the same frequency as the central frequency of the frequency band to which the received signal belongs and is used to convert the received signal to a baseband signal. The oscillator 21 changes the frequency of the local signal based on the signal reported from the SEL 9. The mixers 22 and 24 multiply the received signal by the local signal outputted from the oscillator 21, that is, perform mixing. The phase shifter 23 shifts the phase of the local signal to be outputted to the mixer 22 by $\pi/2$.

The mixer 22 mixes the signal resulting from shifting the phase of the local signal outputted from the oscillator 21 by $\pi/2$ with the received signal and outputs a Qch signal (denoted as "Q" in FIG. 5). On the other hand, the mixer 24 mixes the local signal outputted from the oscillator 21 with the received signal and outputs an Ich signal (denoted as "I" in FIG. 5).

In the orthogonal demodulation section 2, a phenomenon that the local signal leaks out into the received signal inputted to the mixers 22 and 24, that is, self-mixing occurs. This phenomenon is attributable to the parasitic capacitance component which exists in the orthogonal demodulation section 2. To be more specific, referring to FIG. 5, a parasitic capacitance component exists between an input A2 of the mixer 24 and C, and a parasitic capacitance component exists between an input A1 of the mixer 22 and B. Since the local signal outputted from the oscillator 21 has a high frequency, the local signal propagates from C to A2 or from B to A1 via these parasitic capacitances. This is attributable to the fact that the impedance of the parasitic capacitance has a finite value with respect to a finite frequency except 0. The signal propagated from C to A2 is superimposed on the signal inputted from the antenna 1 to the mixer 24 and inputted to the mixer 24. Furthermore, the signal propagated from B to A1 is superimposed on the signal inputted from the antenna 1 to the mixer 22 and inputted to the mixer 22. As a result, the frequency component of the local signal outputted from the oscillator 21 is included in the signal inputted to the mixers 22 and 24 via the antenna 1.

Figure 6:
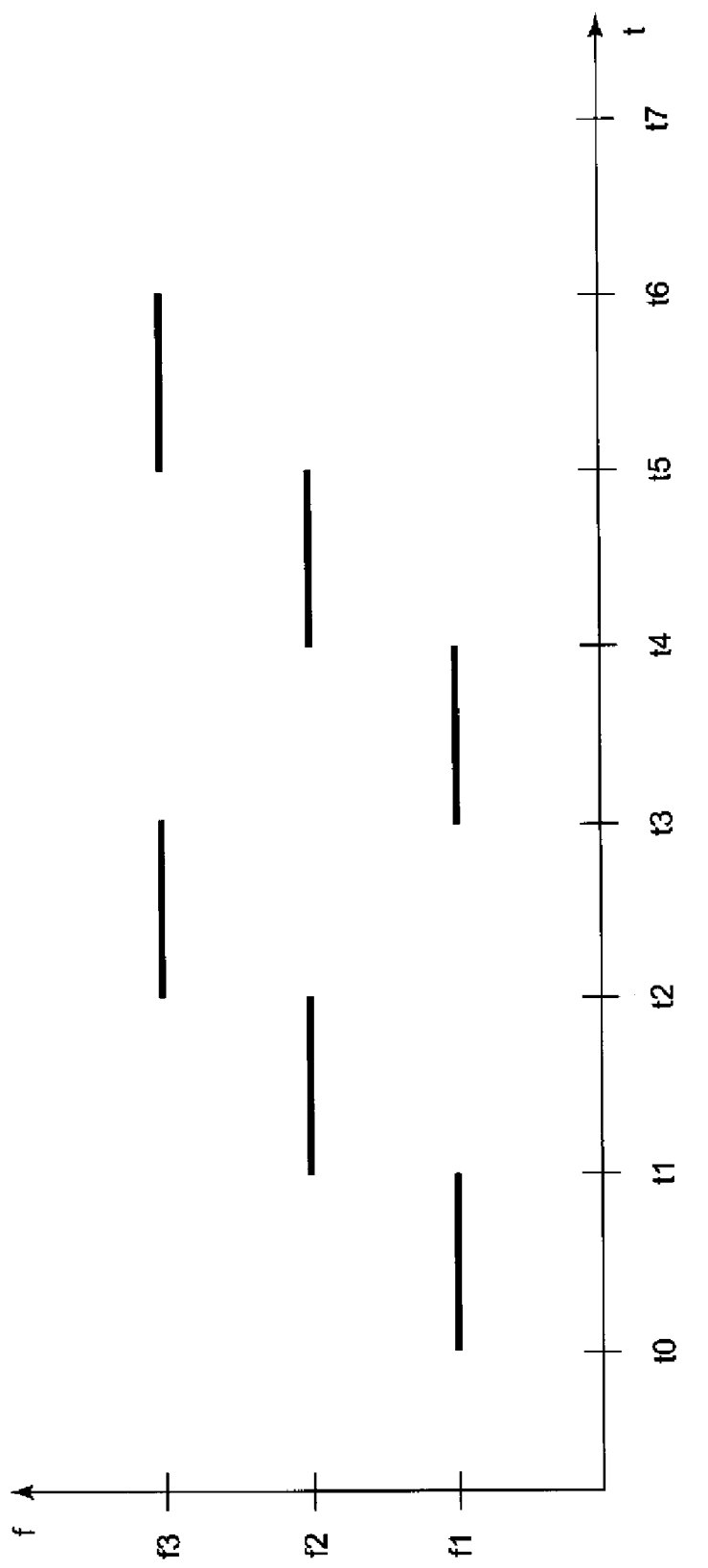
FIG. 6 illustrates a frequency-time relationship of a local signal transmitted from the oscillator shown in association with FIG. 4.
Figure 7:
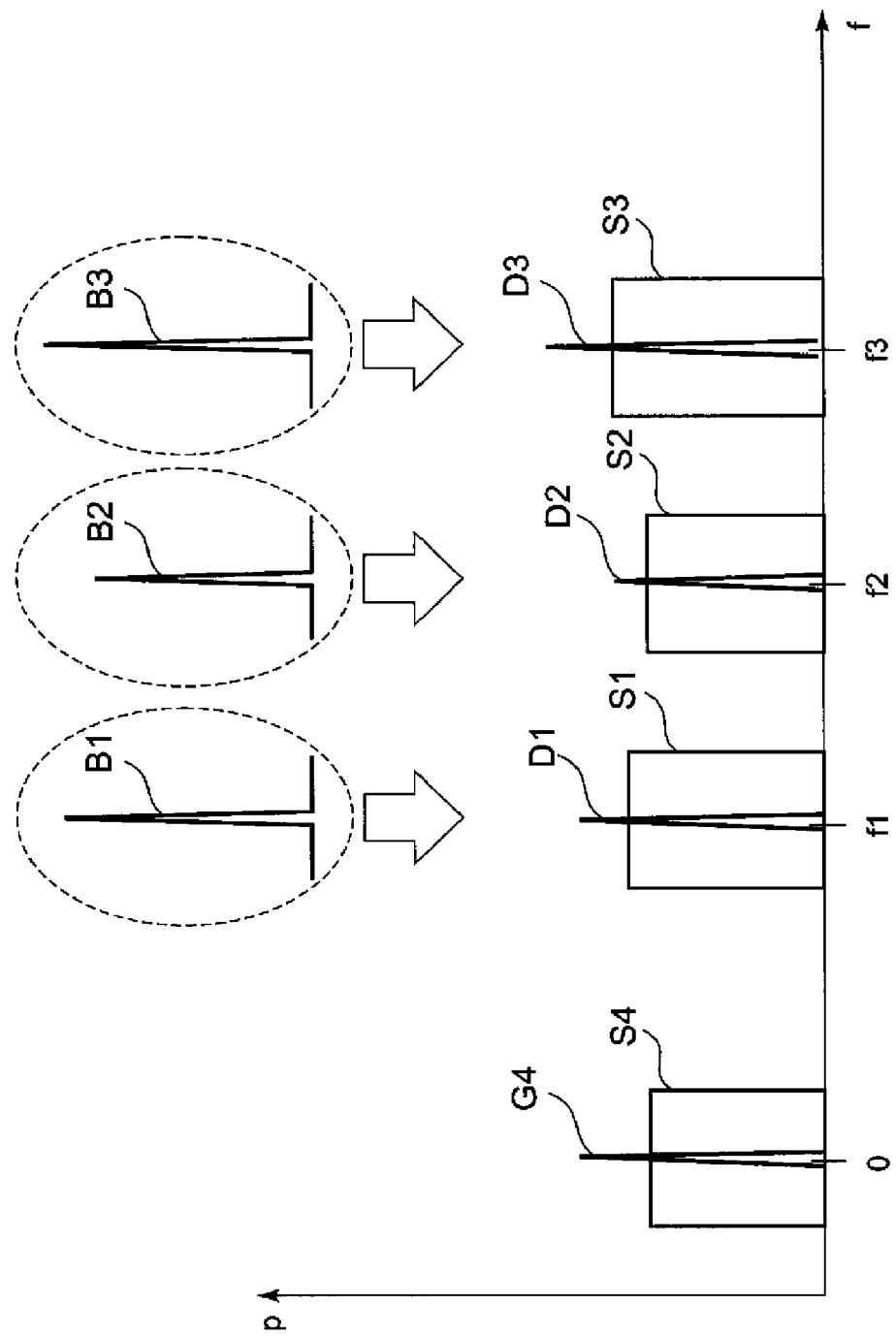
FIG. 7 illustrates an example of a received signal and voltage of a baseband signal.

This phenomenon will be explained using FIG. 4, FIG. 6 and FIG. 7. FIG. 6 illustrates a frequency-time relationship of a local signal transmitted from the oscillator 21 shown in association with FIG. 4. FIG. 7 schematically illustrates a power spectrum of the received signal with the vertical axis showing power and the horizontal axis showing a frequency. When the central frequency of the frequency band to which a carrier belongs changes in a pattern of f1, f2, f3 (FIG. 4), the oscillator 21 sequentially oscillates local signals having frequencies f1, f2, f3 in correspondence with a variation in the central frequency of the frequency band to which the carrier belongs as shown in FIG. 6.

A situation of self-mixing that occurs in the orthogonal demodulation section 2 will be explained using FIG. 7. B1, B2 and B3 shown in FIG. 7 show, for example, frequency components of a local signal outputted from the oscillator 21. Since the central frequency of the frequency band to which the signal received via the antenna 1 belongs changes to any one of f1, f2 and f3 with time, the oscillator 21 also needs to output a local signal having three frequencies f1, f2 and f3. Reference character S1 in FIG. 7 denotes that the frequency of the signal received via the antenna 1 belongs to a frequency band whose central frequency is f1.

This means that the carrier of such a signal uses a frequency that belongs to the frequency band whose central frequency is f1. Likewise, S2 in FIG. 7 denotes that the frequency of the signal received via the antenna 1 belongs to a frequency band whose central frequency is f2. Likewise, S3 in FIG. 7 denotes that the frequency of the signal received via the antenna 1 belongs to a frequency band whose central frequency is f3. Reference character D1 in FIG. 7 denotes a signal component superimposed on a received signal received via the antenna 1 and having a frequency that belongs to a frequency band whose central frequency is f1. The signal component superimposed is, for example, one having frequency f1 of the local signal outputted from the oscillator 21. Likewise, reference character D2 denotes a signal component superimposed on a received signal received via the antenna 1 and having a frequency that belongs to a frequency band whose central frequency is f2. The signal component superimposed is, for example, one having frequency f2 of the local signal outputted from the oscillator 21. Reference character D3 denotes a signal component superimposed on a received signal received via the antenna 1 and having a frequency that belongs to a frequency band whose central frequency is f3. The signal component superimposed is, for example, one having frequency f3 of the local signal outputted from the oscillator 21.

In FIG. 7, for example, the signal having the frequency components S1 and D1 is inputted to the mixer 22 and mixed with the local signal having frequency f1 likewise inputted to the mixer 22. The signal outputted from the mixer 22 then becomes a signal having the frequency component shown by a combination of S4 and G4 in FIG. 7. Double harmonic removed by the low path filter is omitted in the figure. Such a signal frequency component is located in the vicinity of 0 Hz and becomes a baseband. That is, the signal having the frequency component indicated by the combination of S1 and D1 is converted to the signal in a baseband indicated by the combination of S4 and G4.

Here, since G4 is located at 0 Hz, G4 is a DC component. This DC component is generated caused by the signal D1 that has mixed into the signal line connecting, for example, the mixer 22 and antenna 1 through self-mixing.

A DC offset is likewise generated also when the signal having the frequency components indicated by the combination of S2 and D2 is connected to the signal in a baseband. The same applies to the signal having frequency components indicated by the combination of S3 and D3. However, although these cases are common in that DC offsets are generated, DC offset power differs from one case to another.

This is because B1, B2 and B3 in FIG. 7 have different frequencies. Since impedances of parasitic capacitances generated in the orthogonal demodulation section 2 are inversely proportional to the frequency of an input signal, the power of a component superimposed on a signal received via the antenna 1 varies depending on the frequency of a local signal. As a result, DC offsets generated when signals made up of the combinations of S1 and D1, S2 and D2, and S3 and D3 are converted to baseband signals also have power of different magnitudes. There are also a variety of reasons besides this. For example, the magnitudes of power itself the local signals of frequencies f1, f2 and f3 may be different from each other, which may cause differences in power of the respective DC offsets. Another reason can be that the relative relationship in power between the signal inputted from the antenna 1 and the local signal mixed therewith may differ. There are also other various reasons.

In MB-OFDM, the frequency of the local signal outputted from the oscillator 21 needs to be made variable, and therefore the power of a DC offset generated in the signal converted to a baseband also necessarily differs.

The Ich signal and Qch signal outputted from the mixers 22 and 24 and including DC offsets are outputted to the VGA 3.

The VGA 3 amplifies the output signal from the orthogonal demodulation section 2 so that the amplitude thereof matches a full-scale range of the ADC 4. The VGA 3 receives a report on the amplifying voltage from the AGC 11. The AGC 11 determines and reports the voltage to which the VGA 3 amplifies the signal based on the signal outputted from the overlap and add unit 5 and timing information reported from the symbol synchronization section 10.

Figure 8:
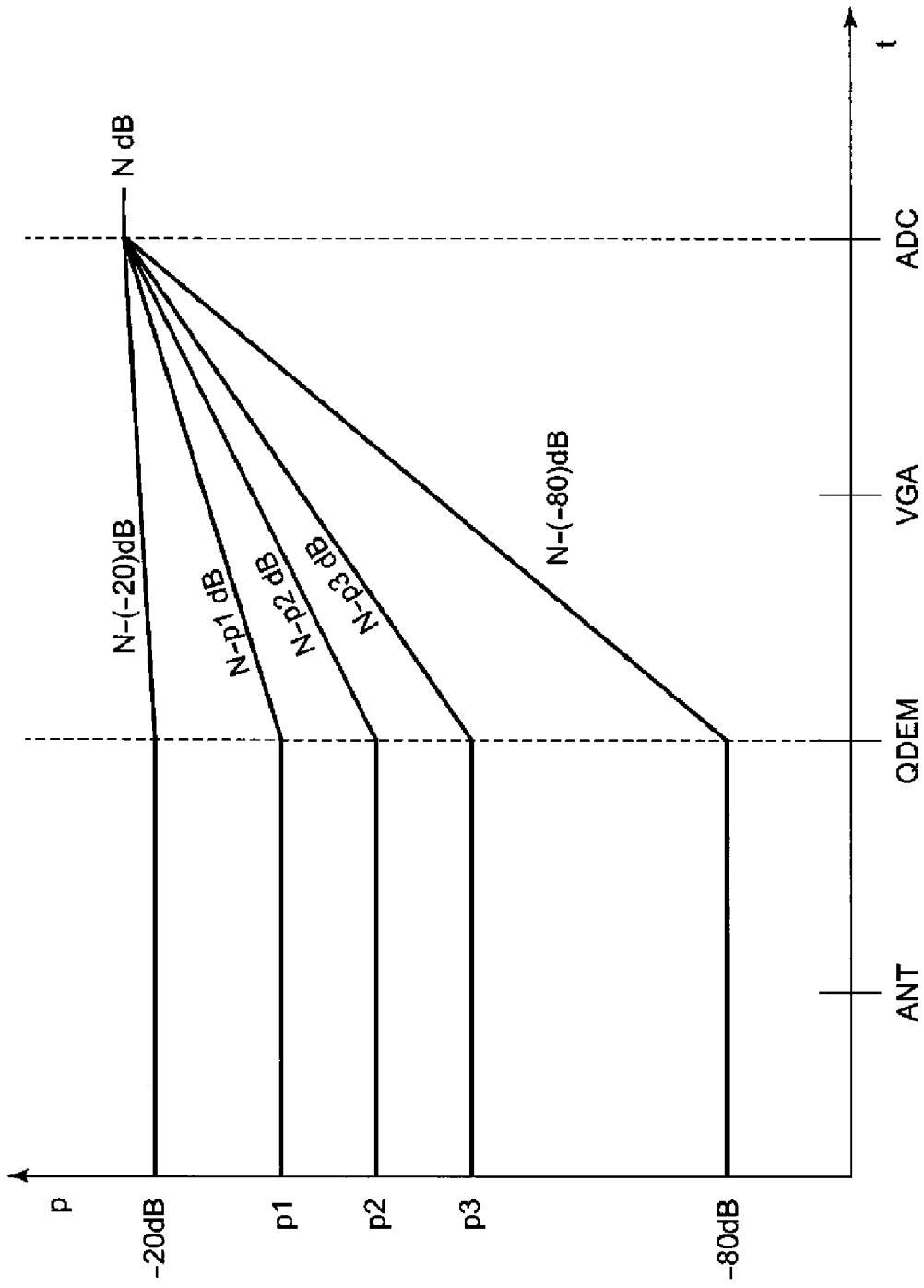
FIG. 8 schematically illustrates an example of variation in the voltage from the antenna to ADC.
Figure 9:
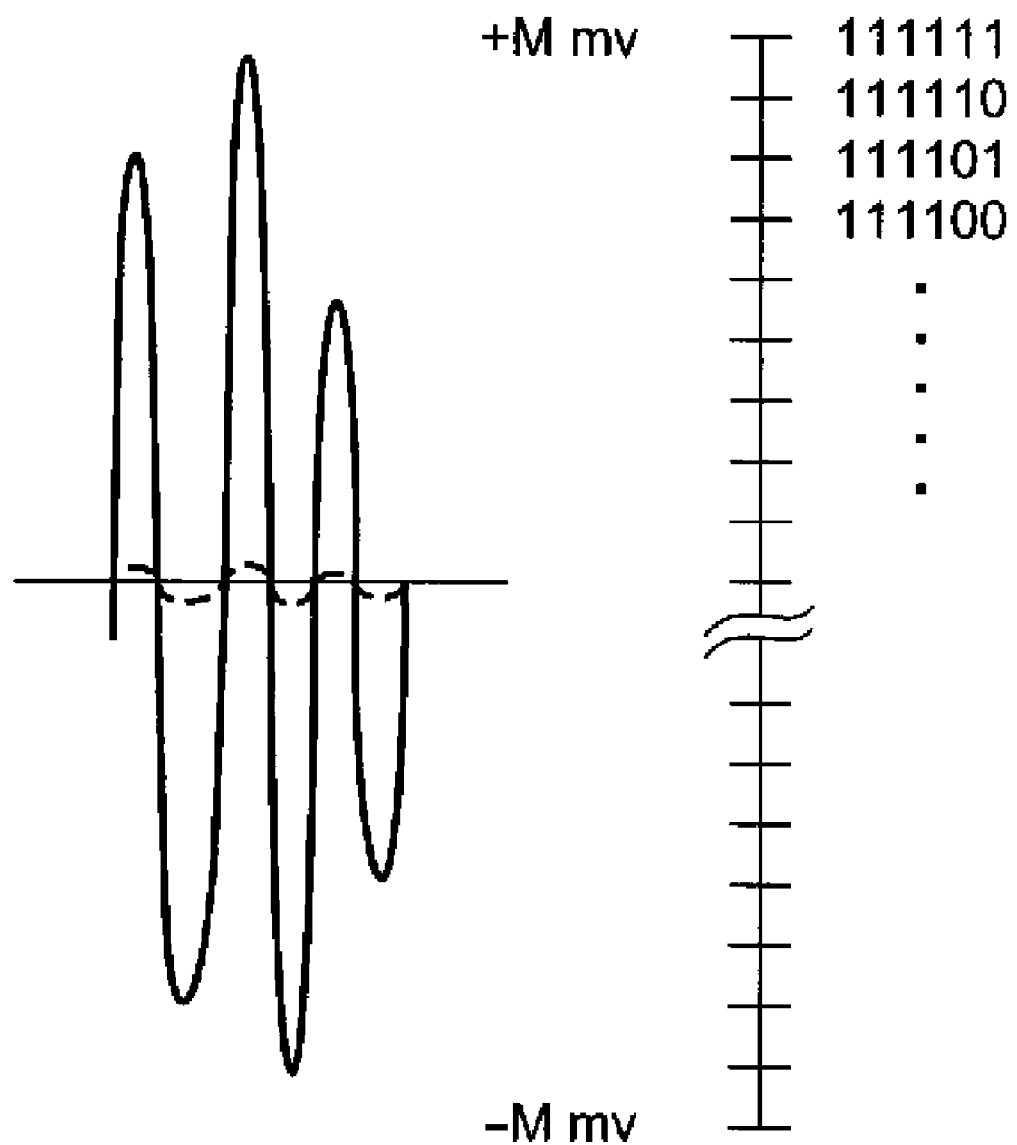
FIG. 9 schematically illustrates the processing by the ADC of converting an analog signal to a digital signal.

FIG. 8 schematically illustrates an example of variation in power of a signal flowing from the antenna 1 to ADC 4 and FIG. 9 schematically illustrates the processing by the ADC 4 of converting an analog signal to a digital signal. As shown in FIG. 8, when a gain of N dB is required by the ADC 4, the VGA 3 amplifies the input signal at amplification factor (gain) corresponding to the gain of the difference. When the power of a received signal carried in a frequency band whose central frequency is f1 is p1, the VGA 3 amplifies the signal by (N−p1) dB. Likewise, when the power of a received signal carried in a frequency band whose central frequency is f2 is p2, the VGA 3 amplifies the signal by (N−p2) dB. When the power of a received signal carried in a frequency band whose central frequency is f3 is p3, the VGA 3 amplifies the signal by (N−p3) dB. Thus, the gain of the VGA 3 differs depending on the power of the received signal belonging to the frequency band.

As shown in FIG. 9, the ADC 4 digitizes an analog signal by sampling the amplitude within a range of +Mmv to −Mmv. For example, when a signal having the amplitude shown by the dotted line is digitized, the same value is indicated, and when an analog signal exceeding the range of amplitude is digitized, portions exceeding the range of amplitude indicate the same value, and it is therefore impossible to obtain correct values. For this reason, the ADC 4 needs to receive an analog signal of predetermined amplitude. Therefore, the VGA 3 amplifies the signal inputted according to the voltage thereof.

It has been stated above that the power of a DC offset included in a signal inputted to the VGA 3 varies depending on the difference in frequency of the signal inputted to the VGA 3, and the VGA 3 adopts a gain that differs depending on the difference in the frequency of the signal inputted. This results in a situation in which the power of a DC offset corresponding to the frequency of the received signal arriving at the antenna 1 varies considerably depending on such a frequency. Furthermore, since the VGA 3 amplifies the input signal, when a DC offset is included in the input signal to the VGA 3, the power of the DC offset included in the output signal of the VGA 3 becomes greater. As shown in Japanese Patent Application No. 2007-096412, which is the prior art, even if a received signal is converted to a baseband using a direct conversion scheme and then a DC offset is removed, the DC offset remains in the signal component inputted to the VGA 3. The remaining offset is amplified by the VGA 3. Moreover, the remaining DC offset is amplified at a different gain according to the frequency of the signal including this DC offset. Thus, not only the removal of the DC offset in the analog region but also the removal of the DC offset in the posterior stage is required. Furthermore, such removal of the DC offset also needs to be flexibly adaptable to the difference in power of DC offsets based on the difference in frequency of received signals.

The VGA 3 outputs the amplified Ich signal and Qch signal to the ADC 4. This outputted signal includes a DC offset caused by leakage of a local signal as described above.

Due to this DC offset, the center of amplitude of the signal outputted from the VGA 3 is shifted (deviated) compared to the center of amplitude of the signal when there is no DC offset when the signal is expressed with a graph with the horizontal axis showing a time scale and the vertical axis showing a voltage.

Figure 10:
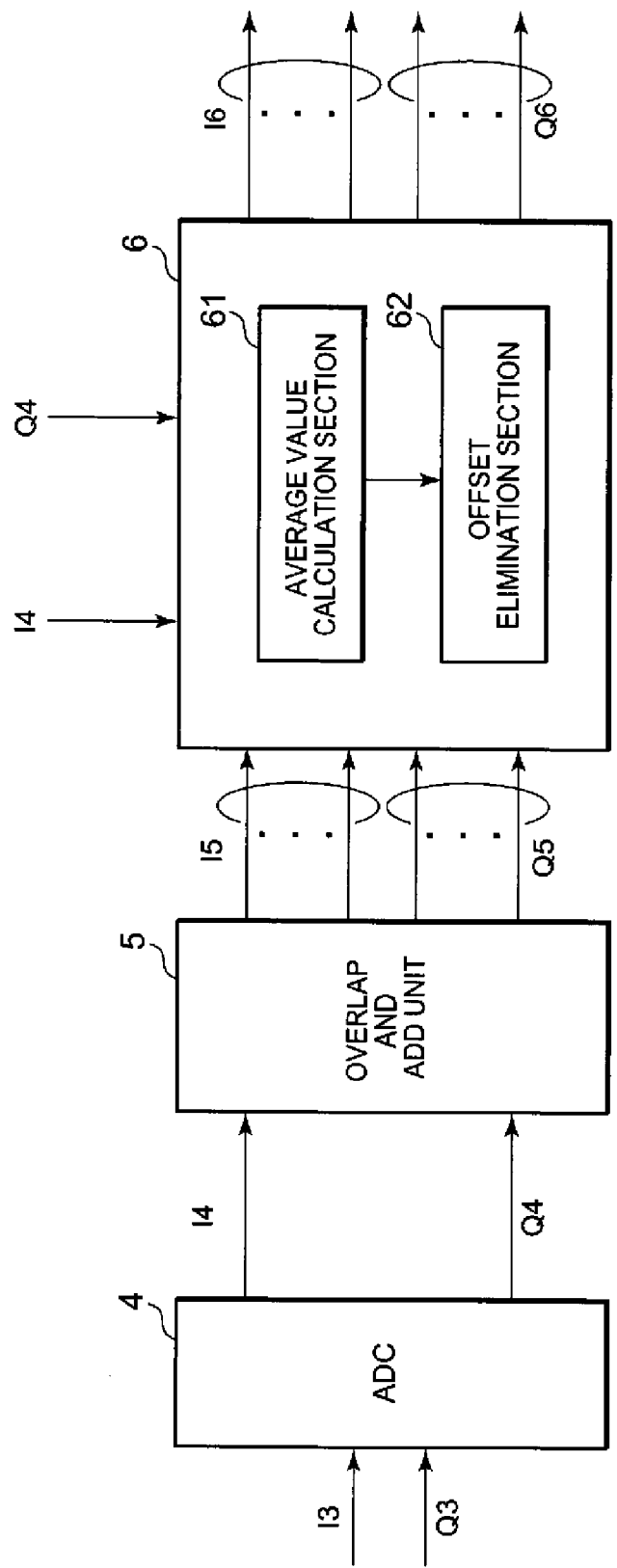
FIG. 10 illustrates the processing from the ADC to the offset canceling section.

The processing from the ADC 4 to the offset canceling section 6 will be explained using FIG. 10 to FIG. 14. FIG. 10 illustrates the processing from the ADC 4 to the offset canceling section 6, and FIG. 11 to FIG. 14 schematically show examples of signals outputted from the respective components shown in FIG. 10. As shown in FIG. 10, signals outputted from the respective components are assigned reference numerals I3 to I6 and Q3 to Q6. FIG. 11 to FIG. 14 show only Qch signals of Ich signals and Qch signals, but the same applies to Ich signals.

Figure 11:
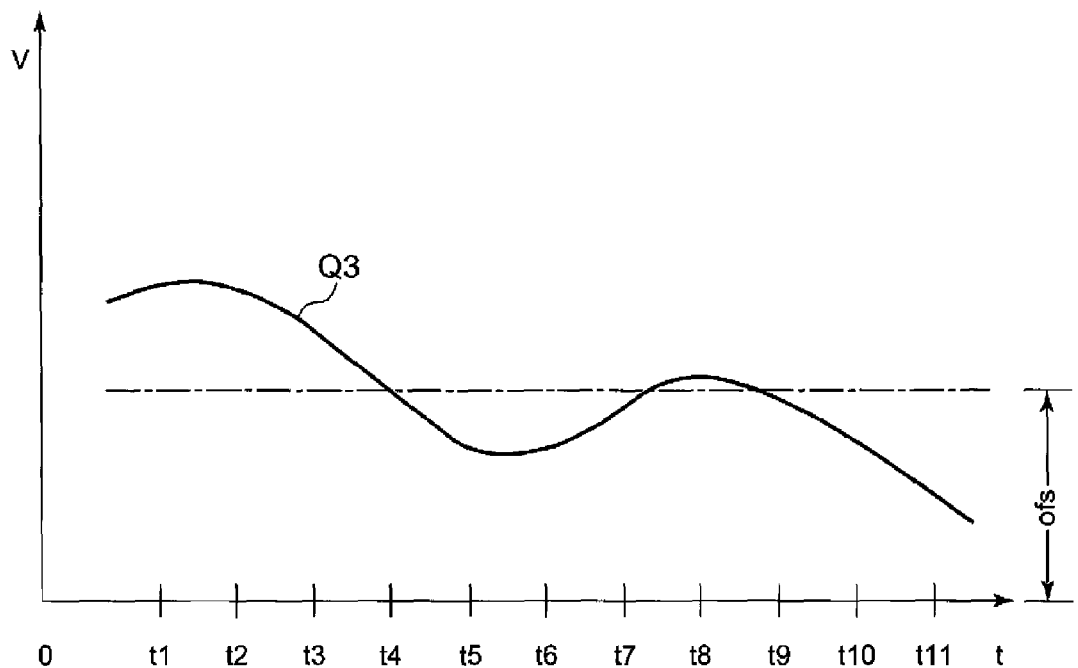
FIG. 11 schematically illustrates a signal outputted from the VGA shown in FIG. 10.

FIG. 11 illustrates an example of a signal (Q3) outputted from the VGA 3. Suppose the portion of amplitude corresponding to time t1 to t8 in the waveform in FIG. 11 corresponds to the OFDM symbol in FIG. 5. Moreover, suppose the portion corresponding to time t9 to t11 corresponds to the ZPS section in FIG. 5. In the explanation in FIG. 5, for example, "0" is inserted in the ZPS section according to the MB-OFDM communication system. However, in the graphs in FIG. 11 to FIG. 14, the portion from time t9 to t11 corresponding to the ZPS section has amplitude which is not "0". This is because the OFDM symbol portion of a signal received with a delay due to the influence of multipath is superimposed on this ZPS section. However, in the actual MB-OFDM communication system, the time domain in which FFT is applicable is a range from time t1 to t8 in FIG. 11 and FFT is not applicable to the signal component from t9 to t11. This has already been described above. Therefore, to earn receiving power efficiently, overlap and add processing is performed whereby the amplitude corresponding to the portion of t9 and t10 is added to the amplitude corresponding to t1 and t2, but this will be described later.

Here, the signal outputted from the VGA 3 is a signal showing a waveform whose center is amplitude 0 in the graph with the vertical axis showing a voltage and the horizontal axis showing a time scale if there is no DC offset. However, since the signal outputted from the VGA 3 actually has a DC offset, a waveform whose center is amplitude 0 is not formed.

Figure 12:
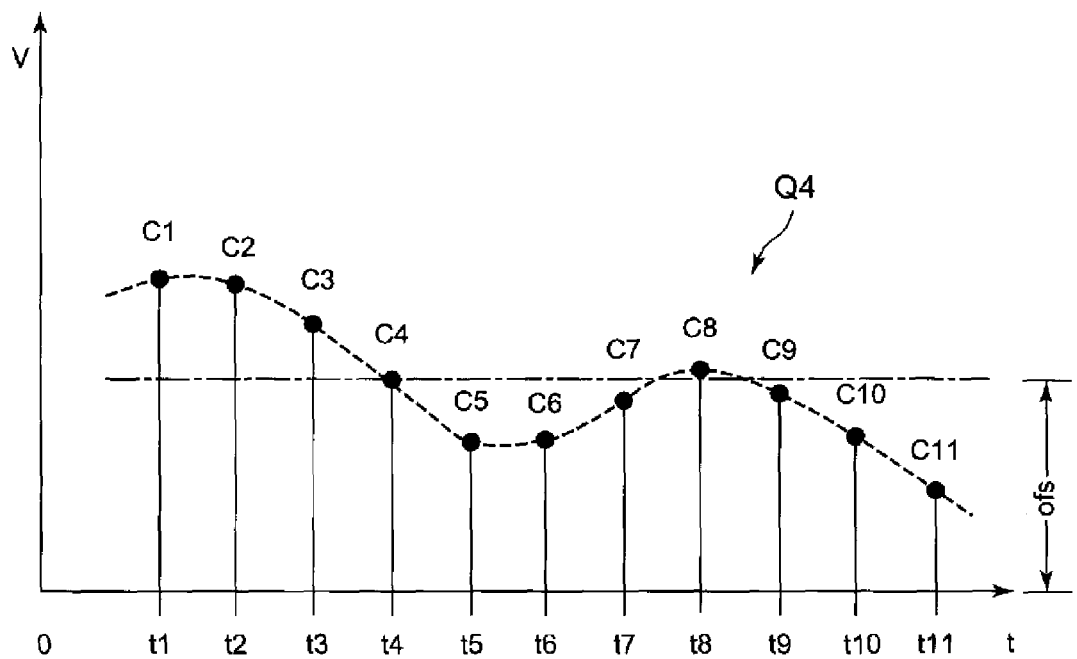
FIG. 12 schematically illustrates a signal outputted from the ADC shown in FIG. 10.
Figure 13:
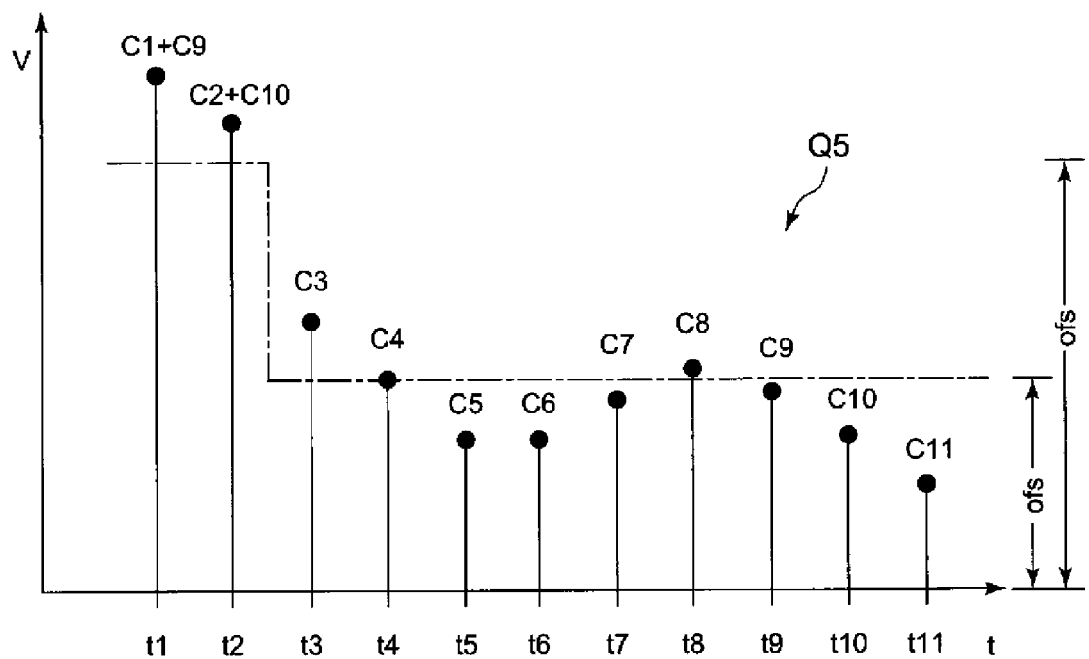
FIG. 13 schematically illustrates signals outputted from the overlap and add unit shown in FIG. 10.
Figure 14:
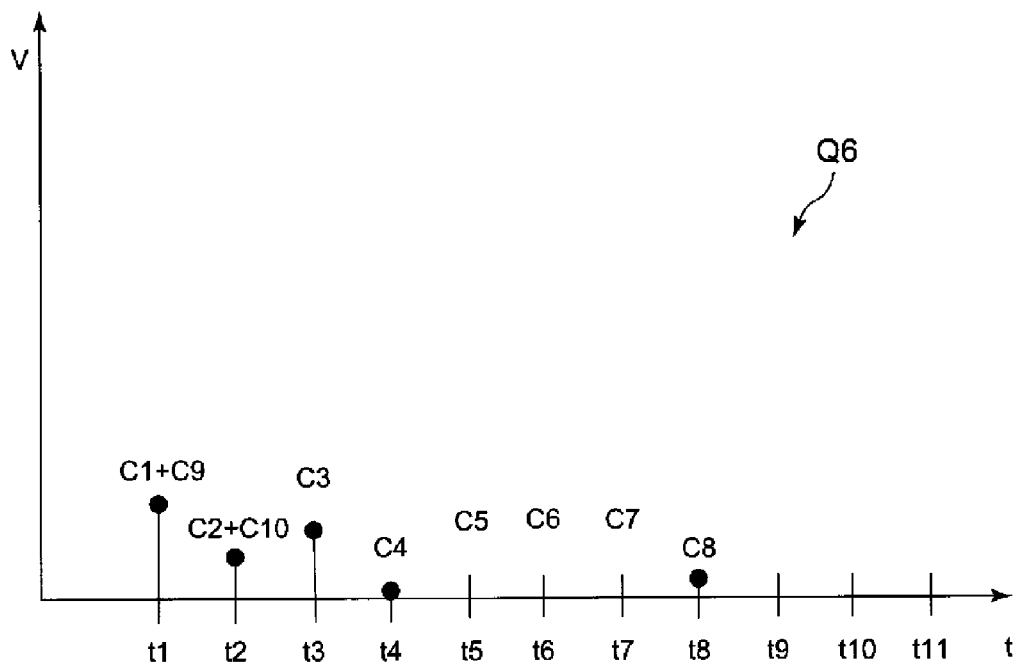
FIG. 14 schematically illustrates signals outputted from the offset canceling section shown in FIG. 10.

FIG. 12 shows an example of signal (Q4) outputted from the ADC 4, FIG. 13 shows an example of signal (Q5) outputted from the overlap and add unit 5 and FIG. 14 shows an example of signal (Q6) outputted from the offset canceling section 6. Furthermore, a signal having five values of C1 to C5 is shown as digitized signal, but the number of values included in the digital signal is not limited to this. Furthermore, the signals shown in FIG. 11 to FIG. 13 include DC offsets and the portion lower than the single dot broken line in the figure is the DC offset (denoted as "ofs" in FIG. 11 to FIG. 13).

The ADC 4 converts the Ich signal and Qch signal outputted from the VGA 3 from an analog signal to a digital signal. The ADC 4 converts the analog signal shown in FIG. 11 to the digital signal shown in FIG. 12.

The overlap and add unit 5 receives the signal digitized by the ADC 4 and performs overlap and add processing. To be more specific, the overlap and add unit 5 adds the data of a predetermined section of ZPS out of the OFDM symbol configuration shown in FIG. 5 to the start portion of the OFDM symbol shown in FIG. 5. The overlap and add processing compensates the transmission path between the transmitting side and the receiving side in the MB-OFDM communication scheme for the influences of fading of signals carried through a plurality of transmission paths.

FIG. 13 shows an example of the signal after the overlap and add processing. FIG. 11 to FIG. 14 show a case where signals C9 and C10 are portions subjected to overlap addition of the ZPS signal. The overlap and add unit 5 adds up C1 and C9 (the signal after the addition is assumed to be C1+C9), and C2 and C10 are added up (the signal after the addition is assumed to be C2+C10). Since the DC offset has also been added to C1+C9 and C2+C10 after the overlap addition, the amount of DC offset of the two signals is doubled. That is, the waveform of the DC offset has a square wave shape, which is a complex waveform.

Explaining the overlap and add processing carried out by the overlap and add unit 5 more specifically, this overlap and add unit 5 performs processing expressed, for example, by the following expression. However, the following expression corresponds to the specific example of the OFDM symbol configuration shown in FIG. 5. That is, the expression shows the overlap and add processing carried out by the overlap and add unit 5 when the OFDM symbol has data made up of 128 sampling points and the ZPS section has data made up of 37 sampling points.

[Expression 1]

$$r_n(t) = \begin{cases} S_n(t) + S_n(t+128) & t = 0, 1, \ldots, 31 \\ S_n(t) & t = 32, 33, \ldots, 127 \end{cases} \quad (1)$$

Although the above expression shows the value of variable t with a specific numerical value, it is self-evident that when the OFDM symbol configuration is changed, the value of t is also changed. It is also obvious that when the OFDM symbol configuration in FIG. 5 is changed, the value of constant 128 is also changed.

Next, the offset canceling section 6 removes the DC offset from the Ich signal and Qch signal subjected to the overlap and add processing by the overlap and add unit 5. The offset canceling section 6 of the present embodiment is provided with an average value calculation section 61 and an offset elimination section 62. The average value calculation section 61 calculates a DC offset of each symbol of the Ich signal and Qch signal based on the Ich signal (I4) and Qch signal (Q4) outputted from the ADC 4. To be more specific, the average value calculation section 61 performs the following processing. As is obvious from FIG. 1 or FIG. 10, the average value calculation section 61 receives signals I4 and Q4 within a predetermined time range outputted by the ADC 4. Next, the average value calculation section 61 calculates an average value of the signal value included in the received signal I4. Explaining more specifically with reference to FIG. 12, the average value calculation section 61 carries out an operation indicated by (C1+C2+C3+C4+C5 . . . +C11)/11 to calculate an average value of the signal value included in the signal I4.

For the signal Q4, the average value calculation section 61 likewise calculates an average of the signal value included in Q4. The average value calculation section 61 then estimates the respective average values calculated from signals I4 and Q4 as the values of DC offsets included in the signal I4 and signal Q4.

As described above, the signal outputted from the orthogonal demodulation section 2 in FIG. 1 is a signal, a time average of the amplitude value of which becomes 0 if no DC offset is mixed. However, a DC offset caused by self-mixing is actually generated in the signal outputted from the orthogonal demodulation section 2. When the signal outputted from the orthogonal demodulation section 2 includes a DC offset, the time average value of the signal does not become 0 and such a time average value means the DC offset value. Therefore, as described above, the average value calculation section 61 calculates a time average of the signal value included in the signal I4 and a time average of the signal value included in Q4 received from the ADC 4, and estimates these calculated time average values as values of the DC offsets included in I4 and Q4. The average value calculation section 61 receives a report on the signal section whose time average should be calculated by the symbol synchronization section 10 as shown in FIG. 1 and performs the above described processing based on the reported information.

The average value calculation section 61 outputs the offset values estimated for the signals I4 and Q4 to the offset elimination section 62.

The offset elimination section 62 uses the offset estimate values calculated by the average value calculation section 61 to remove offset estimate values corresponding to the respective signals from the Ich signal and Qch signal. That is, the offset elimination section 62 subtracts the offset estimate value calculated using the Ich signal from the Ich signal and subtracts the offset estimate value calculated using the Qch signal from the Qch signal. In this case, as for the signal of the section subjected to overlap and add processing, the offset elimination section 62 subtracts a value twice the offset estimate value from the signal. For example, a value twice the offset estimate value is subtracted from C1+C9 and C2+C10 in FIG. 14 respectively. FIG. 14 shows no value for the amplitude whose value resulting from subtracting the offset estimate value becomes 0 or less.

Operations of the offset elimination section 62 will be explained more specifically. First, the offset elimination section 62 receives a report on which section of the signal inputted to the offset elimination section 62 has been subjected to overlap and add processing from the symbol synchronization section 10 in FIG. 1. Next, the offset elimination section 62 calculates values twice the respective offset estimate values of the signals I4 and Q4 received from the average value calculation section 61. The offset elimination section 62 then subtracts a value twice the offset estimate value calculated from the signal I4 from the section subjected to overlap and add processing (e.g., C1+C9, C2+C10 in FIG. 13) out of the respective signal values included in the inputted signal 15. Furthermore, the offset elimination section 62 subtracts the offset estimate value calculated from the signal I4 from the section not subjected to overlap and add processing (e.g., C3, C4, C5 . . . C11 in FIG. 13) out of the signal included in the inputted signal 15. The offset elimination section 62 also performs similar processing on the signal Q5 to remove the DC offset included in the signal Q5. That is, the offset elimination section 62 subtracts a value twice the offset estimate value calculated from the signal Q4 from the section subjected to overlap and add processing out of the respective signal values included in the inputted signal Q5. Furthermore, the offset elimination section 62 subtracts the offset estimate value calculated from the signal Q4 from the section not subjected to overlap and add processing out of the signal value included in the inputted signal Q5.

To put it in more common terms, the offset elimination section 62 subtracts the average value calculated by the average value calculation section 61 from at least part of the value of amplitude included in the inputted signal. The offset elimination section 62 then subtracts a value greater than such an average value from a section different from such an "at least part". In the above described detailed explanation, the "at least part" is a section not subjected to overlap and add processing and the "section different from at least part" is the section subjected to overlap and add processing. The "value greater than the average value" is a value twice the average value in the above described specific explanation.

The operation of the above described offset elimination section 62 is expressed, for example, by the following expressions. However, the following expressions correspond to the data having the OFDM symbol configuration shown in FIG. 5. That is, this is a case where an OFDM symbol is configured by including an OFDM symbol having 128 pieces of data, a guard interval having 32 pieces of data and a ZPS section including a guard time made up of 5 pieces of data.

[Expression 2]

$$r_n(t) = \begin{cases} S_n + S_n(t+128) - 2OFS & t = 0, 1, \ldots, 31 \\ S_n(t) - OFS & t = 32, 33, \ldots, 127 \end{cases} \quad (2)$$

However,

[Expression 3]

$$OFS = \frac{1}{128+32} \sum_{k=0}^{128+32-1} S_n(k) \quad (3)$$

When the configuration of the OFDM symbol is changed, specific numerical values such as 128, 32 are also changed correspondingly.

In the above described embodiment, the average value calculation section 61 in FIG. 10 receives a signal outputted from the ADC 4 in FIG. 10 and calculates a time average of such a signal based on the information reported from the symbol synchronization section 10. That is, in the present embodiment, the average value calculation section 61 calculates offset estimate values for the respective received signals having different frequencies based on frequency hopping of the carrier on the data transmitting side. The offset elimination section 62 then subtracts the corresponding offset estimate values from the received signals having different frequencies in consideration of partial variations of DC offset values generated in overlap and add processing. This allows the DC offset included in the signal received via the antenna 1 in FIG. 1 to be removed in the digital region. Moreover, the above described processing is processing capable of also coping with differences in DC offset values caused by differences in frequency of the signals received via the antenna 1. Furthermore, since an offset estimate value can be calculated using the received signal, there is no need to calculate and record an offset estimate value beforehand, providing advantageous effects also from the standpoint of circuit scale.

The signal outputted from the offset canceling section 6 is inputted to the OFDM demodulation section 7 (see FIG. 1). In this case, FFT is performed only within a time range corresponding to the OFDM symbol part shown in FIG. 5. In the example in FIG. 14, FFT is applied to the amplitude part corresponding to time t1 to t8.

Embodiment 2

Figure 15:
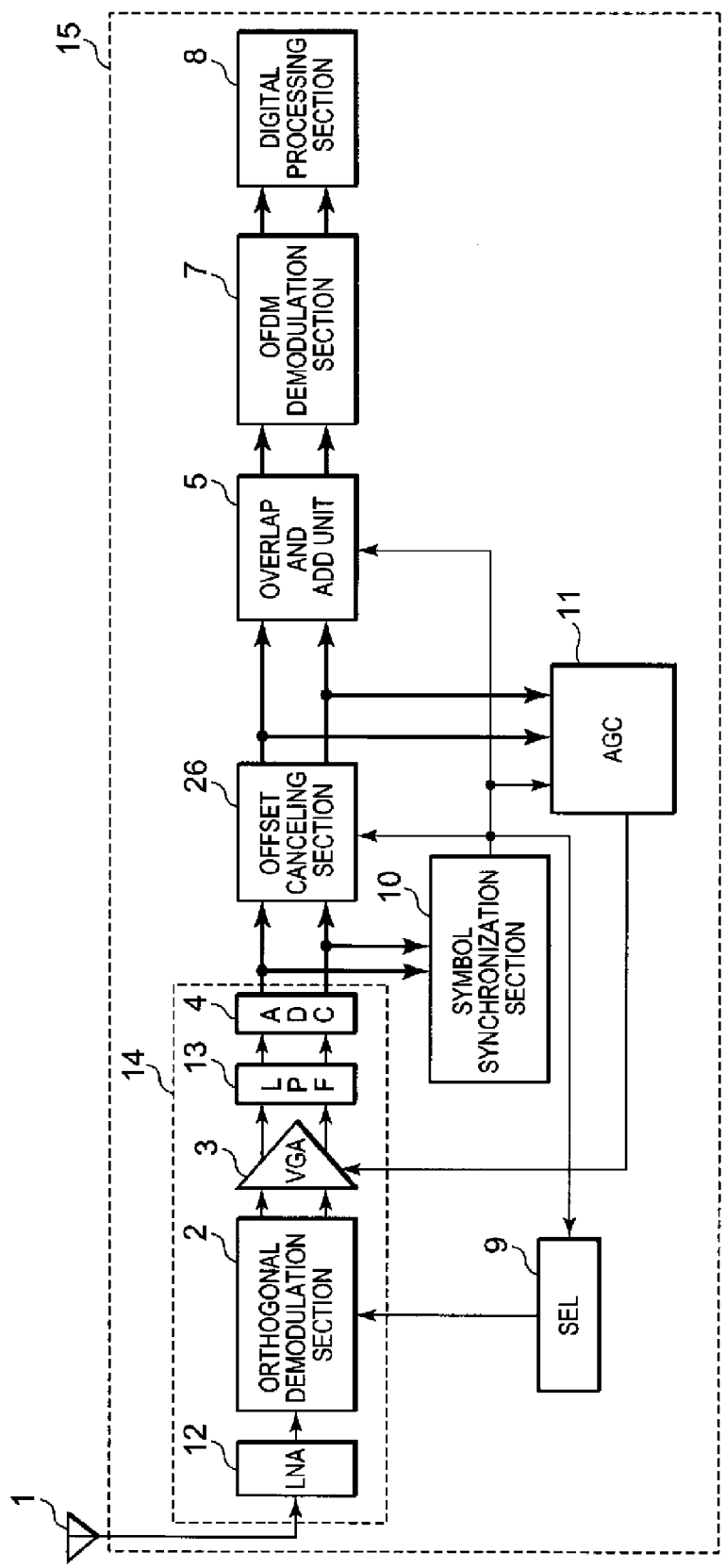
FIG. 15 is a block diagram showing a configuration example of a communication apparatus according to Embodiment 2 of the present invention.

A configuration example has been explained in Embodiment 1 where the offset canceling section 6 performs processing after processing of the overlap and add unit 5. On the other hand, a case will be explained in the present embodiment where an overlap and add unit 5 performs overlap and add processing after processing of an offset canceling section 26. FIG. 15 is a block diagram showing a configuration example of a communication apparatus according to Embodiment 2. In FIG. 15, the arrangement of the offset canceling section 26 and the overlap and add unit 5 is different from that in FIG. 1. The differences from FIG. 1 will be mainly explained. In the internal configuration, the offset canceling section 26 is only provided with an average value calculation section 61 and an offset elimination section 62 as in the case of the configuration shown in FIG. 10. However, the ADC 4 is the only input source of digital signals.

The offset canceling section 26 receives a signal digitized by the ADC 4 and removes a DC offset. To be more specific, the average value calculation section 61 calculates an offset estimate value of each symbol. The method of calculating an offset estimate value is the same as that of Embodiment 1. The offset elimination section 62 uses the offset estimate value calculated by the average value calculation section 61 to remove the corresponding offset estimate values from the Ich signal and Qch signal. In this case, the offset elimination section 62 need not consider the section subjected to overlap and add processing as in the case of Embodiment 1.

The overlap and add unit 5 receives a signal resulting from subtracting an offset estimate value from the offset canceling section 26 and performs overlap and add processing. The overlap and add processing is similar to that in Embodiment 1. The overlap and add unit 5 outputs a signal deprived of the DC offset and subjected to overlap and add processing.

Compared to Embodiment 1, Embodiment 2 can subtract offset estimate values uniformly and thereby simplify processing. Embodiment 2 can thereby simplify the circuit configuration compared to that in Embodiment 1.

Other Embodiments

A case has been explained in the above described embodiments where an offset estimate value is calculated for each symbol, but an offset estimate value may also be calculated frame by frame which is the unit of transmitting a plurality of symbols. For example, an offset estimate value is calculated for each frequency band (e.g., f1, f2 and f3) received at the start of a frame and the first calculated offset estimate value is used for subsequent symbols. Since the communication situation of each symbol in the frame is estimated to be the same, it is possible to maintain the same accuracy as that when an offset estimate value is calculated every time. Furthermore, it is also possible to reduce the processing load and reduce power consumption by calculating an offset estimate value frame by frame.

Furthermore, a case with an MB-OFMD communication format has been explained in the above described embodiments as an example, but the present invention is applicable to a communication apparatus which requires a DC offset to be removed.

As described above, according to any one of the preferable embodiments of the present invention, it is possible to accurately subtract differences of signals caused by unnecessary signal components being demodulated for symbols transmitted under conditions with different carriers and propagation states or the like. This is made possible by calculating offset estimate values for estimating signal differences for each symbol or for each unit (e.g., frame) that makes it possible to estimate that conditions under which symbols are carried are the same. Thus, unnecessary signal components can be removed and signal errors can thereby be suppressed. Especially when a non-signal section in which no data is inserted is subjected to overlap and add processing, influences of unnecessary signal components can be suppressed in the MB-OFDM communication scheme.

EXAMPLES

Figure 16:
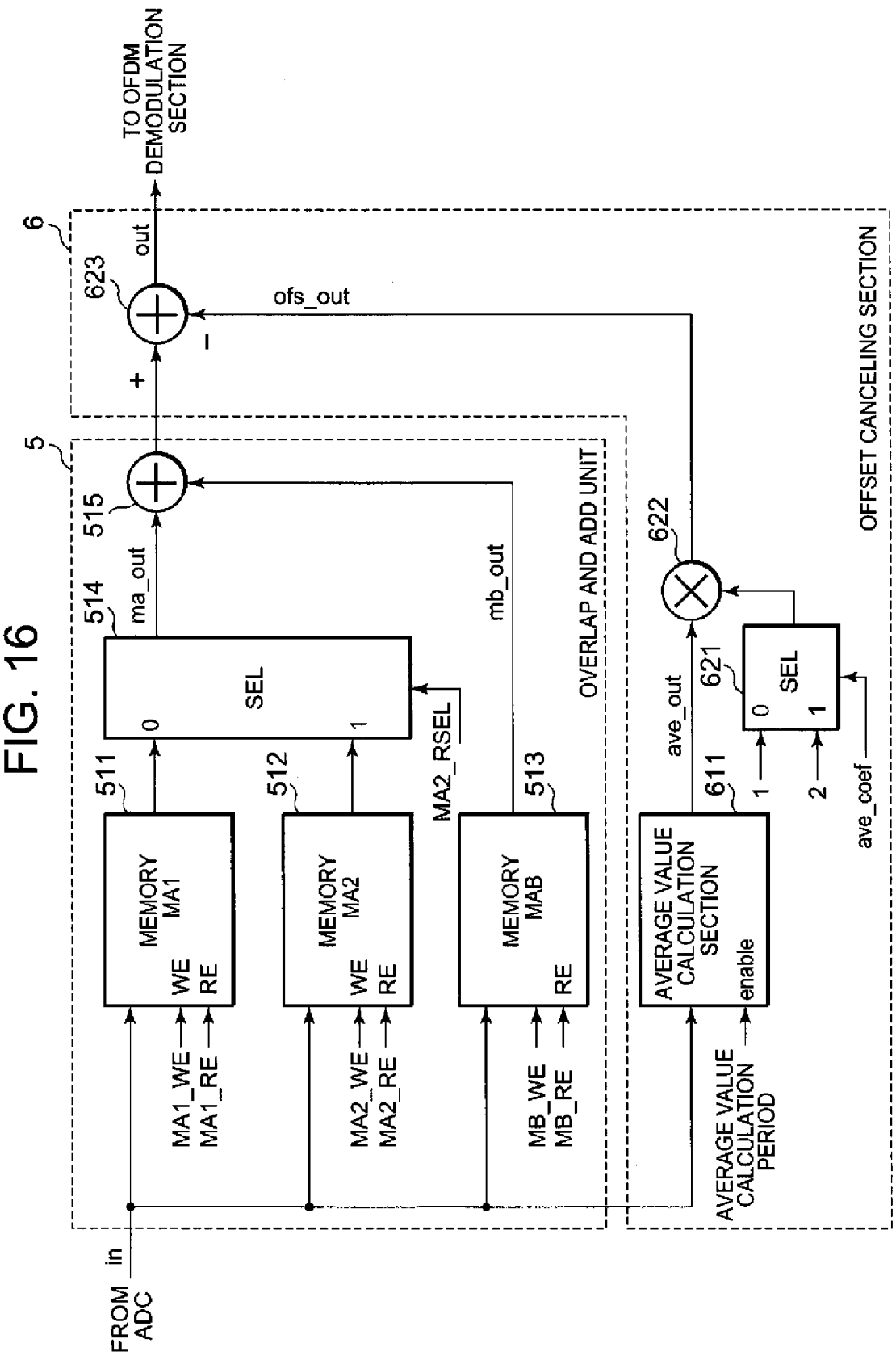
FIG. 16 is a block diagram showing an example of a circuit configuration of the overlap and add unit and offset canceling section when the configuration example shown in FIG. 1 is used.
Figure 17:
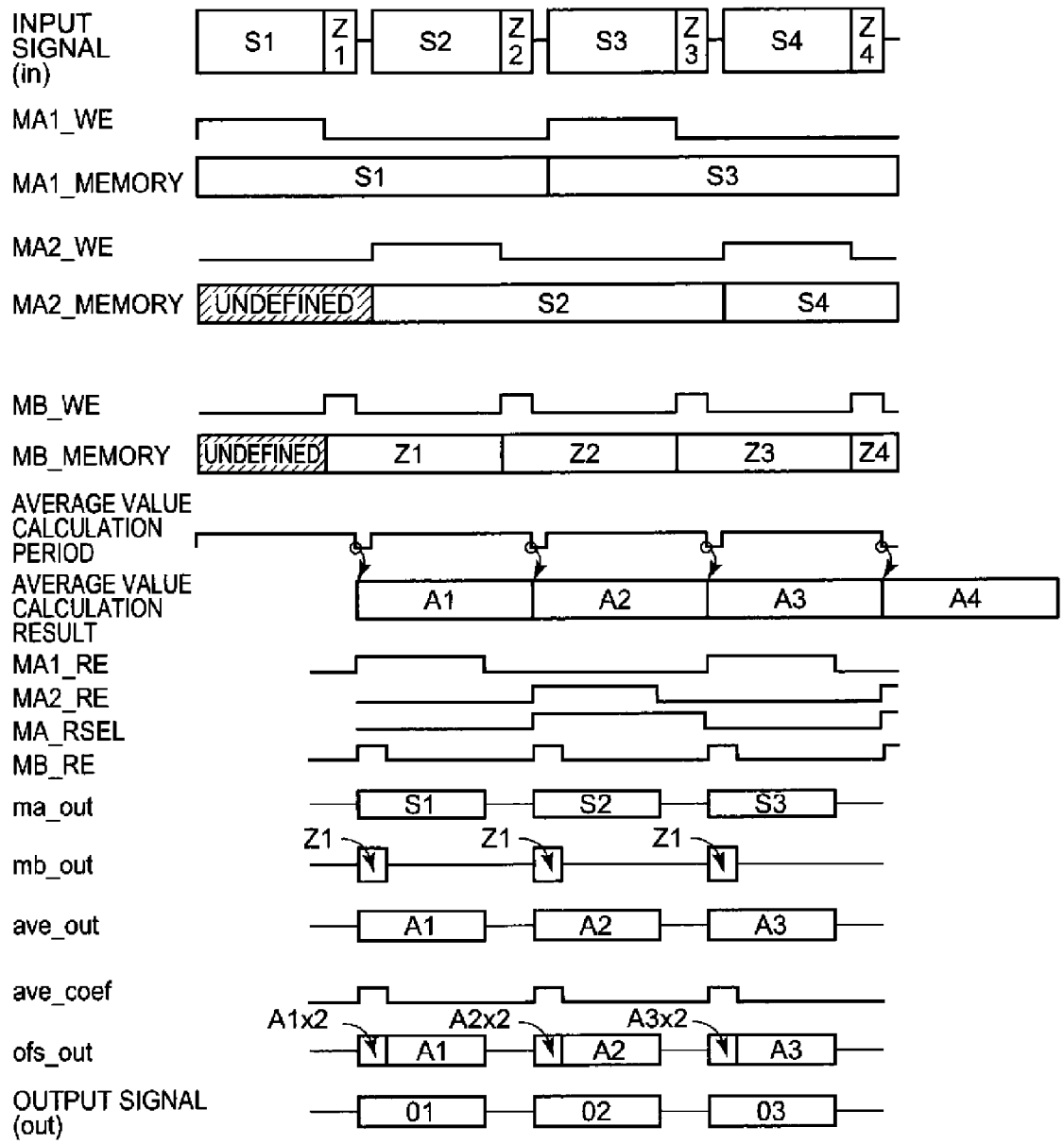
FIG. 17 shows a timing chart illustrating operation examples of the circuit shown in FIG. 16.
Figure 18:
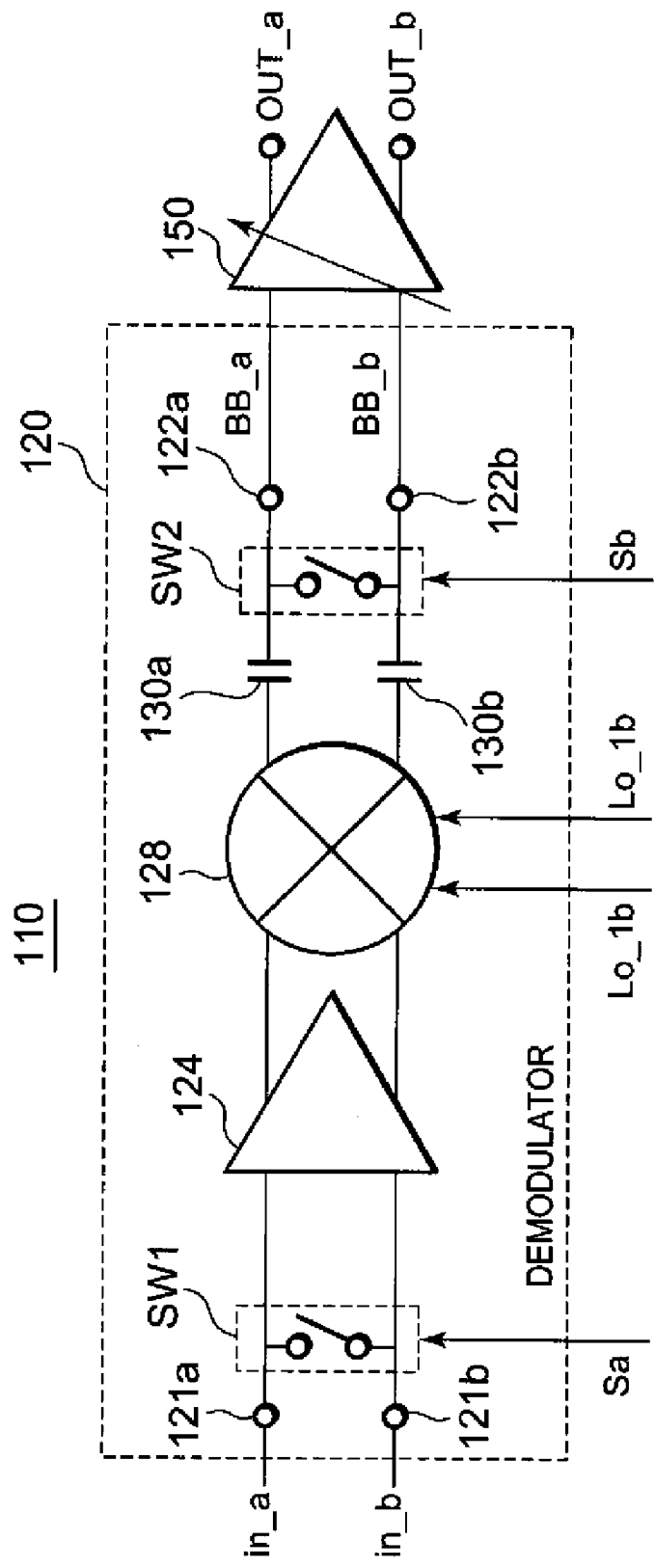
FIG. 18 shows a configuration of a demodulator described in Japanese Patent Application No. 2007-096412.

FIG. 16 shows an example of a circuit configuration of the overlap and add unit and offset canceling section when the configuration example shown in FIG. 1 is used. FIG. 17 shows a timing chart illustrating operations of the circuit shown in FIG. 16. The overlap and add unit 5 is made up of a memory MA1 511, a memory MA2 512, a memory MB 513, a SEL 514 and an adder 515. The offset canceling section 6 is made up of an average value calculation section 611, a SEL 621, a multiplier 622 and an adder 623.

The SEL 621, multiplier 622 and adder 623 correspond to the offset elimination section 62. A signal outputted from the ADC 4 is inputted to the memory MA1 511, memory MA2 512, memory MB 513 and average value calculation section 611.

With reference to FIG. 16 and FIG. 17, more specific operations of the overlap and add unit 5 and offset canceling section 6 will be explained. First, the symbol synchronization section 10 activates MA1_WE (write enable to memory MA1 511) (MA1_WE is high in FIG. 17). In response to activated MA1_WE, the memory MA1 511 stores S1 which is a part of the OFDM symbol shown in FIG. 17 out of the signal outputted from the ADC 4 in FIG. 1 or FIG. 10. Next, the symbol synchronization section 10 inactivates MA1_WE and then activates MB-WE (write enable to memory MB 513) (MB_WE is high in FIG. 17). In response to the activation of MB_WE, the memory MB 513 stores data Z1 of a part of the guard interval included in the ZPS section shown in FIG. 5 out of the signal outputted from the ADC 4.

Next, in response to the storage of Z1 by the memory MB 513 (in synchronization with completion of input of S1 and Z1), the symbol synchronization section 10 activates a control signal indicating an average value calculation period (in FIG. 17, the signal marked "average value calculation period"

is driven low). The average value calculation section 61 included in the offset canceling section 6 in FIG. 16 then calculates an average of the signal value made up of S1 and Z1 in FIG. 17 (average value A1 in FIG. 17). Next, the symbol synchronization section 10 activates MA2_WE (write enable to memory 2) (in FIG. 17, MA2_WE is high). In response to the activation of MA2_WE, the memory MA2 512 stores S2 which is a part of the OFDM symbol shown in FIG. 17 out of the signal outputted from the ADC 4.

The symbol synchronization section 10 then activates MA1_RE (read enable to memory MA1 511) and MBRE (read enable to memory MB 513) (both are high in FIG. 17). In response to the activation of these signals, the memory MA1 511 outputs S1 (ma_out in FIG. 17) and the memory MB 513 outputs Z1 (mb_out in FIG. 17). Furthermore, the average value calculation section 61 outputs an average value A1.

Furthermore, the symbol synchronization section 10 activates ave_coef. This signal is active for a period during which the overlap and add unit 5 performs overlap and add processing. For a period during which ave_coef is active, the selection circuit SEL2 in FIG. 16 outputs "2" to the multiplier in FIG. 16. This causes signal ofs_out outputted from the multiplier to become a value twice the average value A1.

The offset canceling section 6 then subtracts ofs_out indicating the value twice the average value A1 from the signal outputted from the overlap and add unit 5, that is, the result of addition of ma_out and mb_out. Thus, the output signal out indicates that the DC offset has been removed from the part subjected to overlap and add processing by the overlap and add unit 5.

The symbol synchronization section 10 inactivates ave_coef in FIG. 17 when all the part subjected to overlap and add processing out of the OFDM symbol S1 outputted from the memory MA1 511 is outputted. In response to the inactivation of such ave_coef, the output signal of the selection circuit SEL2 in FIG. 16 becomes "1". Therefore, the value used for a subtraction by the adder of the offset canceling section 6 in FIG. 16 becomes the average value A1 itself. In this way, of the signal made up of S1 and Z1, the DC offset corresponding to the portion not subjected to overlap and add processing is canceled appropriately.

It has been mentioned above that the symbol synchronization section 10 activates MA2_WE and the memory MA2 512 stores S2, but the overlap and add processing and offset canceling to be performed after the memory MA2 512 stores S2 will be performed in a flow similar to that described above.

As explained so far, appropriate offset cancellation can be realized in the digital region based on the circuit configuration shown in FIG. 16 and the operations at timings shown in FIG. 17. Moreover, in the present embodiment, when a signal including symbol S1 as information, signal including S2 as information and signal including S3 as information are received by the antenna 1, the signals have frequencies different from each other and when the signals are converted to basebands, even if the signals have DC offsets different from each other, the DC offsets generated in the respective signals can be removed appropriately.

The present invention is not limited to the embodiments described above. The elements of the above described embodiments can be modified, added or converted to contents that can be easily thought of by those skilled in the art without departing from the scope of the present invention. It is apparent that the present invention is not limited to the above embodiments, but may be modified and changed without departing from the scope and spirit of the invention.

What is claimed is:

1. A communication apparatus comprising:
    an offset canceling section receiving a first signal whose amplitude average within a predetermined time range should be 0, calculating an amplitude average value of said first signal, and receiving a second signal to subtract said amplitude average value from one of amplitude values included in said second signal; and
    an overlap and add unit receiving said first signal and adding first one of amplitude values included in said first signal to second one of amplitude values included in said first signal to output said second signal to said offset canceling section,
    wherein said offset canceling section subtracts a value larger than said amplitude average value from another one of amplitude values included in said second signal.

2. The communication apparatus according to claim 1, further comprising:
    an analog/digital converter converting an analog signal inputted thereinto to a digital signal to output said first signal as a digital signal.

3. The communication apparatus according to claim 1, wherein said offset canceling section subtracts a value two times larger than said amplitude average value from another one of amplitude values included in said second signal.

4. A communication apparatus, comprising:
    an offset canceling section receiving a first signal whose amplitude average within a predetermined time range should be 0, calculating an amplitude average value of said first signal, and receiving a second signal to subtract said amplitude average value from one of amplitude values included in said second signal; and
    an overlap and add unit receiving a third signal from said offset canceling section, and adding first one of amplitude values included in said third signal to second one of amplitude values included in said third signal, said third signal being a result of subtracting said calculated amplitude average value from one of amplitude values included in said second signal.

* * * * *